(12) United States Patent
Taguchi et al.

(10) Patent No.: US 7,029,523 B2
(45) Date of Patent: *Apr. 18, 2006

(54) BLACK INK FOR INK-JET RECORDING

(75) Inventors: Toshiki Taguchi, Shizuoka (JP);
Naotaka Wachi, Shizuoka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 118 days.

This patent is subject to a terminal disclaimer.

(21) Appl. No.: 10/671,736

(22) Filed: Sep. 29, 2003

(65) Prior Publication Data

US 2004/0080596 A1  Apr. 29, 2004

(30) Foreign Application Priority Data

Sep. 30, 2002  (JP) ................ P.2002-286179

(51) Int. Cl.
*C09D 11/02*  (2006.01)
(52) U.S. Cl. ............... 106/31.46; 106/31.48; 106/31.5; 106/31.52
(58) Field of Classification Search ............ 106/31.27, 106/31.48, 31.5, 31.52, 31.46
See application file for complete search history.

(56) References Cited

U.S. PATENT DOCUMENTS

| 2004/0053988 A1* | 3/2004 | Taguchi et al. | 514/419 |
| 2004/0070654 A1* | 4/2004 | Taguchi et al. | 347/100 |
| 2004/0080596 A1* | 4/2004 | Taguchi et al. | 347/100 |
| 2004/0154496 A1* | 8/2004 | Taguchi | 106/31.48 |
| 2004/0187734 A1* | 9/2004 | Ozawa et al. | 106/31.27 |
| 2004/0187736 A1* | 9/2004 | Taguchi et al. | 106/31.27 |
| 2004/0187738 A1* | 9/2004 | Taguchi et al. | 106/31.48 |

FOREIGN PATENT DOCUMENTS

EP  0422668  *  4/1991

* cited by examiner

*Primary Examiner*—Helene Klemanski
(74) *Attorney, Agent, or Firm*—Sughrue Mion, PLLC

(57) ABSTRACT

A black ink for ink-jet recording, which is excellent in durability of image (including durability of image quality) and discharging property, obtained by dissolving and/or dispersing at least one black azo dye having a particular property or structure in an aqueous medium, wherein a transition metal ion content of the black ink is 0.1 mmol/l or less.

23 Claims, No Drawings

BLACK INK FOR INK-JET RECORDING

FIELD OF THE INVENTION

The present invention relates to a black ink for ink-jet recording, excellent in durability of image and discharging property.

BACKGROUND OF THE INVENTION

Ink-jet printers have been widely used for printing on papers, films, cloths, etc. not only at offices but also at homes along with popularization of computers in recent years.

Methods for ink-jet recording include methods of applying pressure to an ink by a piezo device to discharge droplets; methods of generating bubbles in an ink by heating the ink to discharge droplets; methods using a ultrasonic wave; and methods of aspirating and discharging droplets by an electrostatic force. Ink compositions used in the ink-jet recording methods are water inks, oil-based inks and solid (melting-type) inks. Among the inks, the water inks have mainly been used from the viewpoints of productivity, handling, odor, safeness, etc.

Coloring agents contained in the inks for ink-jet recording are required to have a high solubility in a solvent; to be capable of recording with a high density; to be excellent in a hue; to be excellent in fastnesses to lights, heat, air, water, chemicals, etc.; to hardly blur on an image-receiving material with excellent fixation; to be excellent in storage stability as an ink; to have no toxicity; to be high in purity; and to be available at a low price. However, it is extremely difficult to find a coloring agent satisfying these requirements at high levels.

Although various dyes and pigments have been proposed and put into practical use as a coloring agent for ink-jet recording, a coloring agent satisfying all the requirements have not been obtained yet at present. It is difficult for conventionally well-known dyes and pigments such as those having a Color Index (C.I.) number to have the hue and fastnesses sufficient for ink-jet recording.

Food black dyes, naphthol-based direct azo dyes, acidic azo dyes, etc. have been widely known as black dyes for ink-jet recording.

The food black dyes include C.I. Food Black 1 and C.I. Food Black 2 as typical examples, and techniques for using them in black inks for ink-jet recording are described in JP-A-2-36276 (the term "JP-A" as used herein means an "unexamined published Japanese patent application"), JP-A-2-233782 and JP-A-2-233783, etc.

Techniques for using the acidic azo dyes such as C.I. Acid Blacks 2, 31, 52, 140 and 187 in black inks for ink-jet recording are described in JP-A-60-108481, JP-A-2-36277 and JP-A-2-36278, etc. Further, techniques for using the direct azo dyes such as C.I. Direct Blacks 9, 17, 38, 51, 60, 102, 107, 122, 142, 154 and 168 in black inks for ink-jet recording are described in JP-A-56-139568, JP-A-61-285275 and JP-A-3-106974, etc.

In general, it is difficult to complete a black hue by one black dye, and whereby the black dye is preferably used in combination with a short wavelength dye.

Known short wavelength dyes are also direct azo dyes, acidic azo dyes, etc. Techniques for using C.I. Acid Yellows 17, 23, 49 and 194, C.I. Direct Yellows 86, 120, 132 and 144, etc. in black inks for ink-jet recording are described in JP-A-7-97541, WO 97/16496, JP-A-10-158560 and JP-A-11-12514, etc.

Dyes used in the present invention are superior to the above dyes in the fastnesses, and a technique for using them in black inks for ink-jet recording is described in Japanese Patent Application No. 2002-113460.

The inventors have investigated the inks comprising dyes for ink-jet. However, it became clear that water black inks had a disadvantage of low durability of image. Further, it was found that few black dyes could singly provide a black image with excellent quality of printed character, differently from carbon black, and the black dyes needed to be used as a mixture of several dyes having different absorption spectra. In this case, the quality of the black-containing image was remarkably deteriorated, when the dyes in the mixture had different fading rates, or when an absorption waveform of a dye with a broad absorption was changed by fading. The inventors have made an intense investigation of increasing the fastnesses of the dye. However, it became clear that the fastnesses of the dye were reduced when the ink composition contained a high concentration of metal ions.

SUMMARY OF THE INVENTION

An object of the present invention is to provide a black ink for ink-jet recording, which is excellent in durability of image (including durability of image quality) and discharging property.

The above object of the present invention has been achieved by black inks for ink-jet recording of the following items.

(1) A black ink for ink-jet recording, comprising a dye dissolved and/or dispersed in an aqueous medium, wherein the dye has a λmax of 500 to 700 nm and a half value width of 100 nm or more in an absorption spectrum of a dilute solution normalized to an absorbance of 1.0, wherein the black ink has: a transition metal ion content of 0.1 mmol/l or less; and a forced fading rate constant $k_{vis}$ of $5.0 \times 10^{-2}$ [hour$^{-1}$] or less, in which the forced fading rate constant $k_{vis}$ is decided by printing a black square symbol of JIS code 2223 in 48-point by using the black ink, measuring a reflection density $D_{vis}$ of the printed symbol through a status A filter to obtain an initial density, forcedly fading the printed symbol by an ozone fading tester capable of continuously generating 5 ppm of ozone, and determining the time taken until the reflection density $D_{vis}$ reaches 80% of the initial density.

(2) A black ink for ink-jet recording, comprising a first dye and a second dye dissolved and/or dispersed in an aqueous medium, in which the first dye has a λmax of 500 to 700 nm and a half value width of 100 nm or more in an absorption spectrum of a dilute solution normalized to an absorbance of 1.0 and the second dye has a λmax of 350 to 500 nm in an absorption spectrum of an aqueous solution, wherein the black ink has a transition metal ion content of 0.1 mmol/l or less.

(3) A black ink for ink-jet recording, comprising a dye dissolved and/or dispersed in an aqueous medium, wherein the dye has a λmax of 500 to 700 nm and a half value width of 100 nm or more in an absorption spectrum of a dilute solution normalized to an absorbance of 1.0, wherein the black ink has a transition metal ion content of 0.1 mmol/l or less; and a ratio R of 1.2 or less, in which the ratio R is defined as a ratio of a maximum value to a minimum value of a forced fading rate constants $k_R$, $k_G$ and $k_B$ that are decided by printing a black square symbol of JIS code 2223 in 48-point by using the black ink, measuring reflection densities $D_R$, $D_G$ and $D_B$ of the printed symbol with respect to 3 colors of C (cyan), M (magenta) and Y (yellow) through a status A filter to obtain initial densities, respectively, forcedly fading the printed symbol by an ozone fading tester capable of continuously generating 5 ppm of ozone, and determining the times taken until the reflection densities $D_R$, $D_G$ and $D_B$ reach 80% of the initial densities, respectively.

(4) A black ink for ink-jet recording, comprising a dye dissolved and/or dispersed in an aqueous medium, wherein the dye has a λmax of 500 to 700 nm and a half value width of 100 nm or more in an absorption spectrum of a dilute solution normalized to an absorbance of 1.0, wherein the black ink has a transition metal ion content of 0.1 mol/l or less, and the black ink comprises a dye having an oxidation potential of more than 1.0 V (vs SCE).

(5) The black ink for ink-jet recording according to the item (4), wherein the dye having a λmax of 500 to 700 nm includes a dye having an oxidation potential of more than 1.0 V (vs SCE).

(6) The black ink for ink-jet recording according to the item (1), which has a ratio R of 1.2 or less, in which the ratio R is defined as a ratio of a maximum value to a minimum value of a forced fading rate constants $k_R$, $k_G$ and $k_B$ that are decided by printing a black square symbol of JIS code 2223 in 48-point by using the black ink, measuring reflection densities $D_R$, $D_G$ and $D_B$ of the printed symbol with respect to 3 colors of C (cyan), M (magenta) and Y (yellow) through a status A filter to obtain initial densities, respectively, forcedly fading the printed symbol by an ozone fading tester capable of continuously generating 5 ppm of ozone, and determining the times taken until the reflection densities $D_R$, $D_G$ and $D_B$ reach 80% of the initial densities, respectively.

(7) The black ink for ink-jet recording according to the item (6), which comprises a dye having an oxidation potential of more than 1.0 V (vs SCE).

(8) The black ink for ink-jet recording according to the item (2), which has: a forced fading rate constant $k_{vis}$ of $5.0 \times 10^{-2}$ [hour$^{-1}$] or less; and a ratio R of 1.2 or less, in which the forced fading rate constant $k_{vis}$ is decided by printing a black square symbol of JIS code 2223 in 48-point by using the black ink, measuring a reflection density $D_{vis}$ of the printed symbol through a status A filter to obtain an initial density, forcedly fading the printed symbol by an ozone fading tester capable of continuously generating 5 ppm of ozone, and determining the time taken until the reflection density $D_{vis}$ reaches 80% of the initial density, and the ratio R is defined as a ratio of a maximum value to a minimum value of a forced fading rate constants $k_R$, $k_G$ and $k_B$ that are decided by printing a black square symbol of JIS code 2223 in 48-point by using the black ink, measuring reflection densities $D_R$, $D_G$ and $D_B$ of the printed symbol with respect to 3 colors of C (cyan), M (magenta) and Y (yellow) through a status A filter to obtain initial densities, respectively, forcedly fading the printed symbol by an ozone fading tester capable of continuously generating 5 ppm of ozone, and determining the times taken until the reflection densities $D_R$, $D_G$ and $D_B$ reach 80% of the initial densities, respectively.

(9) The black ink for ink-jet recording according to the item (8), which comprises a dye having an oxidation potential of more than 1.0 V (vs SCE).

(10) The black ink for ink-jet recording according to the item (3), which has a forced fading rate constant $k_{vis}$ of $5.0 \times 10^{-2}$ hour$^{-1}$ or less, in which the forced fading rate constant $k_{vis}$ is decided by printing a black square symbol of JIS code 2223 in 48-point by using the black ink, measuring a reflection density $D_{vis}$ of the printed symbol through a status A filter to obtain an initial density, forcedly fading the printed symbol by an ozone fading tester capable of continuously generating 5 ppm of ozone, and determining the time taken until the reflection density $D_{vis}$ reaches 80% of the initial density.

(11) The black ink for ink-jet recording according to the item (10), which comprises a dye having an oxidation potential of more than 1.0 V (vs SCE).

(12) The black ink for ink-jet recording according to the item (1), which comprises a dye represented by the following general formula (1):

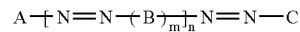

wherein A, B and C each independently represent an aromatic or heterocyclic group, which are substituted or unsubstituted; m is 1 or 2; n is an integer of 0 or more.

(13) The black ink for ink-jet recording according to the item (12), wherein the dye represented by the general formula (1) includes a dye having a λmax of 350 to 500 nm in an absorption spectrum of an aqueous solution.

(14) The black ink for ink-jet recording according to the item (2), which comprises a dye represented by the following general formula (1):

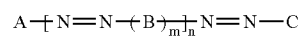

wherein A, B and C each independently represent an aromatic or heterocyclic group, which are substituted or unsubstituted; m is 1 or 2; n is an integer of 0 or more.

(15) The black ink for ink-jet recording according to the item (14), wherein the dye represented by the general formula (1) includes a dye having a λmax of 350 to 500 nm in an absorption spectrum of an aqueous solution.

(16) The black ink for ink-jet recording according to the item (3), which comprises a dye represented by the following general formula (1):

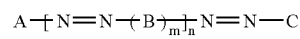

wherein A, B and C each independently represent an aromatic or heterocyclic group, which are substituted or unsubstituted; m is 1 or 2; n is an integer of 0 or more.

(17) The black ink for ink-jet recording according to the item (16), wherein the dye represented by the general formula (1) includes a dye having a λmax of 350 to 500 nm in an absorption spectrum of an aqueous solution.

(18) The black ink for ink-jet recording according to the item (4), which comprises a dye represented by the following general formula (1):

wherein A, B and C each independently represent an aromatic or heterocyclic group, which are substituted or unsubstituted; m is 1 or 2; n is an integer of 0 or more.

(19) The black ink for ink-jet recording according to the item (18), wherein the dye represented by the general formula (1) includes a dye having a λmax of 350 to 500 nm in an absorption spectrum of an aqueous solution.

DETAILED DESCRIPTION OF THE INVENTION

The present invention is described in detail below.

The black ink for ink-jet recording of the invention comprises a dye (L), which has a λmax within a range of 500 to 700 nm and is such that a dilute solution of the dye (L) normalized to an absorbance of 1.0 exhibits an absorption spectrum with a half value width ($W_{\lambda, 1/2}$) of 100 nm or more, preferably 120 to 500 nm, more preferably 120 to 350 nm.

The dye (L) may be used singly for the black ink when the dye (L) can singly provide a high-image quality sharp black color, in which a color tone of any of B, G and R is hardly conspicuous, not depending on light sources for observation. The dye (L) is usually used in combination with a dye capable of covering a region in which the dye (L) has a low absorbancy. In general, the dye (L) is preferably used with a dye (S) absorbing mainly a light in a yellow region. The dye (L) may be used with a further dye to produce the black ink.

In the invention, the dye (L) is dissolved and/or dispersed in an aqueous medium alone or with another dye, to produce the black ink. The black ink of the invention satisfies any of the following Conditions 1 to 4, to obtain properties preferred for ink-jet recording, including 1) excellent weather-fastness and/or 2) black color balance that is not lost even after fading.

First, a black square symbol of JIS code 2223 is printed in 48-point by using the black ink, and a reflection density $D_{vis}$ of the printed symbol is measured by a status A filter (visual filter) to determine an initial density. As a reflection density-measuring apparatus comprising the status A filter, for example, X-Rite density-measuring apparatuses may be used. In the case of measuring a density of black, a measured value of the reflection density $D_{vis}$ is used herein as a standard, observed reflection density. The printed symbol is forced to fade by an ozone fading tester capable of continuously generating 5 ppm of ozone, and a forced fading rate constant $k_{vis}$ is obtained from a time t required for the reflection density $D_{vis}$ to be reduced to 80% of the initial density, by using a relational expression of $0.8 = \exp(-k_{vis} \cdot t)$.

In the invention, the forced fading rate constant $k_{vis}$ of the black ink is $5.0 \times 10^{-2}$ hour$^{-1}$ or less, preferably $3.0 \times 10^{-2}$ hour$^{-1}$ or less, more preferably $1.0 \times 10^{-2}$ hour$^{-1}$ or less (Condition 1).

Also, a black square symbol of JIS code 2223 is printed in 48-point by using the black ink, and reflection densities $D_R$, $D_G$ and $D_B$ of the printed symbol are measured with respect to 3 colors of C (cyan), M (magenta) and Y (yellow) by a status A filter to determine initial densities, respectively. The reflection densities $D_R$, $D_G$ and $D_B$ herein represent a density of C reflection by a red filter, a density of M reflection by a green filter, and a density of Y reflection by a blue filter, respectively. The printed symbol is forced to fade by an ozone fading tester capable of continuously generating 5 ppm of ozone as above, and forced fading rate constants $k_R$, $k_G$ and $k_B$ are obtained from times required for the reflection densities $D_R$, $D_G$ and $D_B$ to be reduced to 80% of the initial densities, respectively. In the case where a ratio R is defined as a ratio of a maximum value to a minimum value of the three forced fading rate constants $k_R$, $k_G$ and $k_B$ (for example, $R = k_R/k_G$ when the constant $k_R$ is the maximum value and the constant $k_G$ is the minimum value), the ratio R of the black ink is 1.2 or less, preferably 1.1 or less, more preferably 1.05 or less (Condition 2).

Incidentally, the above black square symbol of JIS code 2223 is printed in 48-point, which is sufficiently large for covering an aperture of the reflection density-measuring apparatus and thereby being measured with respect to the densities.

In addition, an oxidation potential of at least one dye used for the black ink is more than 1.0 V (vs SCE), preferably more than 1.1 V (vs SCE), more preferably more than 1.2 V (vs SCE), and most preferably more than 1.25 V (vs SCE), and at least one dye with such oxidation potential preferably has a λmax of 500 nm or more (Condition 3).

In the invention, the oxidation potential is measured by a direct current polarography using an SCE (saturated calomel electrode) as a reference electrode, a graphite electrode as a working electrode, and a platinum electrode as a counter electrode, in an N,N-dimethylformamide solution containing 0.1 mol·dm$^{-3}$ of tetrapropylammonium perchlorate as a supporting electrolyte (concentration of the compound: $1 \times 10^{-3}$ mol·dm$^{-3}$). There is a case where a water-soluble dye is hardly dissolved in N,N-dimethylformamide. In this case, the water-soluble dye is dissolved in water of as small amount as possible, and the resultant solution is diluted with N,N-dimethylformamide such that the water content of the solution is 2% or less, to measure the oxidation potential.

The value of the oxidation potential is often affected by liquid junction potential or solution resistance of a sample solution, etc. to be changed in approximately several tens mV. However, the measured value of the oxidation potential can be reproducibly obtained when calibration using a standard sample such as hydroquinone is carried out.

Further, the black ink of the invention may comprise an azo dye represented by the general formula (1). The azo dye of the general formula (1) may correspond to the dye (L), which has a λmax within a range of 500 to 700 nm and is such that a dilute solution thereof normalized to an absorbance of 1.0 exhibits an absorption spectrum with a half value width of 100 nm or more. In addition, the azo dye of the general formula (1) may correspond to a dye (S) having a λmax within a range of 350 to 500 nm. At least one dye (L) in the black ink is preferably the azo dye of the general formula (1), at least one dye (L) and at least one dye (S) in the black ink are particularly preferably the azo dye of the general formula (1) respectively, and further, it is preferred that 90% or more by mass of total dyes contained in the black ink are such as represented by the general formula (1) (Condition 4).

The black ink of the invention satisfies at least one of the above-mentioned Conditions 1 to 4.

Next, among the dyes represented by the general formula (1), those corresponding to the dye (L) are described in detail below.

In the general formula (1), A, B and C independently represent a substituted or unsubstituted aromatic group, or a substituted or unsubstituted heterocyclic group. Each of A and C is a monovalent group, and B is a divalent group. m is 1 or 2, and n is an integer of 0 or more.

It is preferred that m and n are independently 1 or 2, and in this case, two or more of A, B and C are preferably a substituted or unsubstituted, unsaturated heterocyclic group, respectively. It is particularly preferred that m and n are 1, and at least B and C are each an unsaturated heterocyclic group.

The azo dye of the general formula (1) is preferably a dye represented by the following general formula (2). General formula (2)

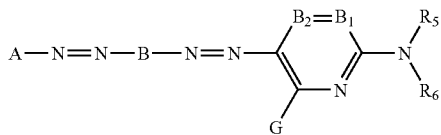

In the general formula (2), A and B have the same meanings as those in the general formula (1), respectively. $B_1$ and $B_2$ may represent $=CR_1-$ and $-CR_2=$, respectively. Alternatively, one of $B_1$ and $B_2$ may be a nitrogen atom and the other may be $=CR_1-$ or $-CR_2=$.

G, $R_1$ and $R_2$ independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclyloxycarbonyl group, an acyl group, a hydroxy group, an alkoxy group, an aryloxy group, a heterocyclyloxy group, a silyloxy group, an acyloxy group, a carbamoyloxy group, an alkoxycarbonyloxy group, an aryloxycarbonyloxy group, an amino group (which may be an alkylamino group, an arylamino group or a heterocyclylamino group), an acylamino group, a ureido group, a sulfamoylamino group, an alkoxycarbonylamino group, an aryloxycarbonylamino group, an alkyl or aryl sulfonylamino group, a heterocyclylsulfonylamino group, a nitro group, an alkyl or aryl thio group, a heterocyclylthio group, an alkyl or aryl sulfonyl group, a heterocyclylsulfonyl group, an alkyl or aryl sulfinyl group, a heterocyclylsulfinyl group, a sulfamoyl group, or a sulfo group. These groups may have a substituent.

$R_5$ and $R_6$ independently represent a hydrogen atom, an aliphatic group, an aromatic group, a heterocyclic group, an acyl group, an alkoxycarbonyl group, an aryloxycarbonyl group, a carbamoyl group, an alkyl or aryl sulfonyl group, or a sulfamoyl group. These groups may have a substituent. Incidentally, at least one of $R_5$ and $R_6$ is not a hydrogen atom.

Further, $R_1$ and $R_5$, or $R_5$ and $R_6$ may bond together to form a 5- or 6-membered ring.

The azo dye of the general formula (2) is preferably a dye represented by the following general formula (3).

General Formula (3)

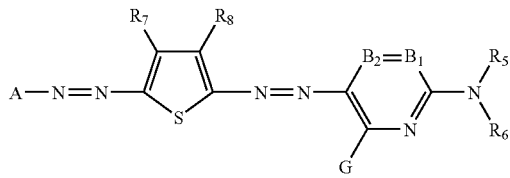

In the general formula (3), $R_7$ and $R_8$ have the same meanings as $R_1$ in the general formula (2), respectively.

Examples of the halogen atom include a fluorine atom, a chlorine atom and a bromine atom.

The aliphatic group may be an alkyl group, a substituted alkyl group, an alkenyl group, a substituted alkenyl group, an alkynyl group, a substituted alkynyl group, an aralkyl group or a substituted aralkyl group. The aliphatic group may be branched and may form a ring. The carbon number of the aliphatic group is preferably 1 to 20, more preferably 1 to 16. Each aryl moiety of the aralkyl group and the substituted aralkyl group is preferably a phenyl or naphtyl moiety, particularly preferably a phenyl moiety. Examples of such aliphatic groups include a methyl group, an ethyl group, a butyl group, an isopropyl group, a t-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group, and an allyl group.

The monovalent aromatic group may be an aryl group or a substituted aryl group. The aryl group is preferably a phenyl group or a naphtyl group, particularly preferably a phenyl group. The carbon number of the monovalent aromatic group is preferably 6 to 20, more preferably 6 to 16. Examples of such monovalent aromatic groups include a phenyl group, a p-tolyl group, a p-methoxyphenyl group, an o-chlorophenyl group and a m-(3-sulfopropylamino)phenyl group. The divalent aromatic group is such that derived from the monovalent aromatic group. Examples of such divalent aromatic groups include a phenylene group, a p-tolylene group, a p-methoxyphenylene group, an o-chlorophenylene group, a m-(3-sulfopropylamino)phenylene group, a naphtylene group, etc.

The heterocyclic group may be a substituted heterocyclic group or an unsubstituted heterocyclic group. The heterocycle of the heterocyclic group may form a condensed ring with an aliphatic ring, an aromatic ring or another heterocycle. The heterocycle of the heterocyclic group is preferably a 5- or 6-membered ring, and contains a heteroatom such as N, O and S. Examples of substituents of the substituted heterocyclic group include aliphatic groups, halogen atoms, alkylsulfonyl groups, arylsulfonyl groups, acyl groups, acylamino groups, sulfamoyl groups, carbamoyl groups, ionic, hydrophilic groups, etc. Examples of heterocycles in the monovalent or divalent heterocyclic group include a pyridine ring, a thiophene ring, a thiazole ring, a benzothiazole ring, a benzoxazole ring, and a furan ring.

The carbamoyl group may be a substituted carbamoyl group or an unsubstituted carbamoyl group. Examples of substituents of the substituted carbamoyl group include alkyl groups. Examples of such carbamoyl groups include a methylcarbamoyl group and a dimethylcarbamoyl group.

The alkoxycarbonyl group may be a substituted alkoxycarbonyl group or an unsubstituted alkoxycarbonyl group. The alkoxycarbonyl group preferably has a carbon number of 2 to 20. Examples of substituents of the substituted alkoxycarbonyl group include ionic, hydrophilic groups. Examples of such alkoxycarbonyl groups include a methoxycarbonyl group and an ethoxycarbonyl group.

The aryloxycarbonyl group may be a substituted aryloxycarbonyl group or an unsubstituted aryloxycarbonyl group. The aryloxycarbonyl group preferably has a carbon number of 7 to 20. Examples of substituents of the substituted aryloxycarbonyl group include ionic, hydrophilic groups. Examples of such aryloxycarbonyl groups include a phenoxycarbonyl group.

The heterocyclyloxycarbonyl group may be a substituted heterocyclyloxycarbonyl group or an unsubstituted heterocyclyloxycarbonyl group. The heterocyclyloxycarbonyl group preferably has a carbon number of 2 to 20. Examples of substituents of the substituted heterocyclyloxycarbonyl group include ionic, hydrophilic groups. Examples of such heterocyclyloxycarbonyl groups include a 2-pyridyloxycarbonyl group.

The acyl group may be a substituted acyl group or an unsubstituted acyl group. The acyl group preferably has a carbon number of 1 to 20. Examples of substituents of the substituted acyl group include ionic, hydrophilic groups. Examples of such acyl groups include an acetyl group and a benzoyl group.

The alkoxy group may be a substituted alkoxy group or an unsubstituted alkoxy group. The alkoxy group preferably has a carbon number of 1 to 20. Examples of substituents of the substituted alkoxy group include alkoxy groups, a hydroxyl group, and ionic, hydrophilic groups. Examples of such alkoxy groups include a methoxy group, an ethoxy group, an isopropoxy group, a methoxyethoxy group, a hydroxyethoxy group and a 3-carboxypropoxy group.

The aryloxy group may be a substituted aryloxy group or an unsubstituted aryloxy group. The aryloxy group preferably has a carbon number of 6 to 20. Examples of substituents of the substituted aryloxy group include alkoxy groups and ionic, hydrophilic groups. Examples of such aryloxy groups include a phenoxy group, a p-methoxyphenoxy group and an o-methoxyphenoxy group.

The heterocyclyloxy group may be a substituted heterocyclyloxy group or an unsubstituted heterocyclyloxy group. The heterocyclyloxy group preferably has a carbon number of 2 to 20. Examples of substituents of the substituted heterocyclyloxy group include alkyl groups, alkoxy groups, and ionic, hydrophilic groups. Examples of such heterocyclyloxy groups include a 3-pyridyloxy group and a 3-thienyloxy group.

The silyloxy group preferably has a substituent of an aliphatic group or an aromatic group having a carbon number of 1 to 20. Examples of such silyloxy groups include a trimethylsilyl oxy group and a diphenylmethylsilyloxy group.

The acyloxy group may be a substituted acyloxy group or an unsubstituted acyloxy group. The acyloxy group preferably has a carbon number of 1 to 20. Examples of substituents of the substituted acyloxy group include ionic, hydrophilic groups. Examples of such acyloxy groups include an acetoxy group and a benzoyloxy group.

The carbamoyloxy group may be a substituted carbamoyloxy group or an unsubstituted carbamoyloxy group. Examples of substituents of the substituted carbamoyloxy group include alkyl groups. Examples of such carbamoyloxy groups include an N-methylcarbamoyloxy group.

The alkoxycarbonyloxy group may be a substituted alkoxycarbonyloxy group or an unsubstituted alkoxycarbonyloxy group. The alkoxycarbonyloxy group preferably has a carbon number of 2 to 20. Examples of such alkoxycarbonyloxy groups include a methoxycarbonyloxy group and an isopropoxycarbonyloxy group.

The aryloxycarbonyloxy group may be a substituted aryloxycarbonyloxy group or an unsubstituted aryloxycarbonyloxy group. The aryloxycarbonyloxy group preferably has a carbon number of 7 to 20. Examples of such aryloxycarbonyloxy groups include a phenoxycarbonyloxy group.

The amino group may have a substituent of an alkyl group, an aryl group or a heterocyclic group, and the substituent may further have a substituent.

The alkylamino group preferably has a carbon number of 1 to 20. Examples of substituents on the alkylamino group include ionic, hydrophilic groups. Examples of such alkylamino groups include a methylamino group and a diethylamino group.

The arylamino group may be a substituted arylamino group or an unsubstituted arylamino group. The arylamino group preferably has a carbon number of 6 to 20. Examples of substituents of the substituted arylamino group include halogen atoms, and ionic, hydrophilic groups. Examples of such arylamino groups include an anilino group and a 2-chlorophenylamino group.

The heterocyclylamino group may be a substituted heterocyclylamino group or an unsubstituted heterocyclylamino group. The heterocyclylamino group preferably has a carbon number of 2 to 20. Examples of substituents of the substituted heterocyclylamino group include alkyl groups, halogen atoms, and ionic, hydrophilic groups.

The acylamino group may be a substituted acylamino group or an unsubstituted acylamino group. The acylamino group preferably has a carbon number of 2 to 20. Examples of substituents of the substituted acylamino group include ionic, hydrophilic groups. Examples of such acylamino groups include an acetylamino group, a propionylamino group, a benzoylamino group, an N-phenylacetylamino group and a 3,5-disulfobenzoylamino group.

The ureido group may be a substituted ureido group or an unsubstituted ureido group. The ureido group preferably has a carbon number of 1 to 20. Examples of substituents of the substituted ureido group include alkyl groups and aryl groups. Examples of such ureido groups include a 3-methylureido group, a 3,3-dimethylureido group and a 3-phenylureido group.

The sulfamoylamino group may be a substituted sulfamoylamino group or an unsubstituted sulfamoylamino group. Examples of substituents of the substituted sulfamoylamino group include alkyl groups. Examples of such sulfamoylamino groups include an N,N-dipropylsulfamoylamino group.

The alkoxycarbonylamino group may be a substituted alkoxycarbonylamino group or an unsubstituted alkoxycarbonylamino group. The alkoxycarbonylamino group preferably has a carbon number of 2 to 20. Examples of substituents of the substituted alkoxycarbonylamino group include ionic, hydrophilic groups. Examples of such alkoxycarbonylamino groups include an ethoxycarbonylamino group.

The aryloxycarbonylamino group may be a substituted aryloxycarbonylamino group or an unsubstituted aryloxycarbonylamino group. The aryloxycarbonylamino group preferably has a carbon number of 7 to 20. Examples of substituents of the substituted aryloxycarbonylamino group include ionic, hydrophilic groups. Examples of such aryloxycarbonylamino groups include a phenoxycarbonylamino group.

The alkyl or aryl sulfonylamino group may be a substituted alkyl or aryl sulfonylamino group or an unsubstituted alkyl or aryl sulfonylamino group. The alkyl or aryl sulfonylamino group preferably has a carbon number of 1 to 20. Examples of substituents of the substituted alkyl or aryl sulfonylamino group include ionic, hydrophilic groups. Examples of such alkyl or aryl sulfonylamino groups include a methylsulfonylamino group, an N-phenyl-methylsulfonylamino group, a phenylsulfonylamino group, and a 3-carboxyphenylsulfonylamino group.

The heterocyclylsulfonylamino group may be a substituted heterocyclylsulfonylamino group or an unsubstituted heterocyclylsulfonylamino group. The heterocyclylsulfonylamino group preferably has a carbon number of 1 to 12. Examples of substituents of the substituted heterocyclylsulfonylamino group include ionic, hydrophilic groups. Examples of such heterocyclylsulfonylamino groups include a 2-thiophenesulfonylamino group, and a 3-pyridylsulfonylamino group.

The heterocyclylsulfonyl group may be a substituted heterocyclylsulfonyl group or an unsubstituted heterocyclylsulfonyl group. The heterocyclylsulfonyl group preferably has a carbon number of 1 to 20. Examples of substituents of the substituted heterocyclylsulfonyl group include ionic, hydrophilic groups. Examples of such heterocyclylsulfonyl groups include a 2-thiophenesulfonyl group, a 3-pyridylsulfonyl group.

The heterocyclylsulfinyl group may be a substituted heterocyclylsulfinyl group or an unsubstituted heterocyclylsulfinyl group. The heterocyclylsulfinyl group preferably has a carbon number of 1 to 20. Examples of substituents of the substituted heterocyclylsulfinyl group include ionic, hydrophilic groups. Examples of such heterocyclylsulfinyl groups include a 4-pyridylsulfinyl group.

The alkyl, aryl or heterocyclyl thio group may be a substituted alkyl, aryl or heterocyclyl thio group or an unsubstituted alkyl, aryl or heterocyclyl thio group. The alkyl, aryl or heterocyclyl thio group preferably has a carbon number of 1 to 20. Examples of substituents of the substituted alkyl, aryl or heterocyclyl thio group include ionic, hydrophilic groups. Examples of such alkyl, aryl or heterocyclyl thio groups include a methylthio group, a phenylthio group, and a 2-pyridylthio group.

The alkyl or aryl sulfonyl group may be a substituted alkyl or aryl sulfonyl group or an unsubstituted alkyl or aryl sulfonyl group. Examples of such alkyl or aryl sulfonyl groups include a methylsulfonyl group and a phenylsulfonyl group.

The alkyl or aryl sulfinyl group may be a substituted alkyl or aryl sulfinyl group or an unsubstituted alkyl or aryl sulfinyl group. Examples of such alkyl or aryl sulfinyl groups include a methylsulfinyl group and a phenylsulfinyl group.

The sulfamoyl group may be a substituted sulfamoyl group or an unsubstituted sulfamoyl group. Examples of substituents of the substituted sulfamoyl group include alkyl groups. Examples of such sulfamoyl groups include a dimethylsulfamoyl group and a di-(2-hydroxyethyl)sulfamoyl group.

Next, the general formulae (1), (2) and (3) are described below.

In the following description, groups and substituents are such as described above.

In the general formula (1), A, B and C independently represent a substituted or unsubstituted aromatic group (each of A and C is a monovalent aromatic group such as an aryl group, and B is a divalent aromatic group such as an arylene group), or a substituted or unsubstituted heterocyclic group (each of A and C is a monovalent heterocyclic group, and B is a divalent heterocyclic group). Examples of aromatic rings in the aromatic group include a benzene ring and a naphthalene ring, and examples of heteroatoms in the heterocyclic group include N, O, and S. The heterocycle of the heterocyclic group may form a condensed ring with an aliphatic ring, an aromatic ring or another heterocycle.

The substituent on the aromatic group and the heterocyclic group may be an arylazo group or a heterocyclylazo group.

Further, two or more of A, B and C are preferably a heterocyclic group, respectively.

The heterocyclic group of C is preferably an aromatic, nitrogen-containing, 6-membered heterocyclic group represented by the following general formula (4). The general formula (1) corresponds to the general formula (2) when C is an aromatic, nitrogen-containing, 6-membered heterocyclic group represented by the general formula (4).

General Formula (4)

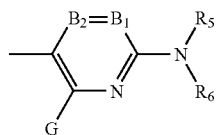

In the general formula (4), $B_1$ and $B_2$ may represent $=CR_1-$ and $-CR_2=$, respectively. Alternatively, one of $B_1$ and $B_2$ may be a nitrogen atom and the other may be $=CR_1-$ or $-CR_2=$. It is preferable that $B_1$ and $B_2$ represent $=CR_1-$ and $-CR_2=$, respectively.

$R_5$ and $R_6$ independently represent a hydrogen atom, an aliphatic group, an aromatic group, a heterocyclic group, an acyl group, an alkoxycarbonyl group, an aryloxycarbonyl group, a carbamoyl group, an alkyl or aryl sulfonyl group, or a sulfamoyl group. These groups may have a substituent. $R_5$ and $R_6$ are preferably a hydrogen atom, an aliphatic group, an aromatic group, a heterocyclic group, an acyl group, or an alkyl or aryl sulfonyl group, respectively. $R_5$ and $R_6$ are more preferably a hydrogen atom, an aromatic group, a heterocyclic group, an acyl group, or an alkyl or aryl sulfonyl group, respectively. $R_5$ and $R_6$ are the most preferably a hydrogen atom, an aryl group, or a heterocyclic group, respectively. These groups may further have a substituent. Incidentally, at least one of $R_5$ and $R_6$ is not a hydrogen atom.

G, $R_1$ and $R_2$ independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclyloxycarbonyl group, an acyl group, a hydroxy group, an alkoxy group, an aryloxy group, a heterocyclyloxy group, a silyloxy group, an acyloxy group, a carbamoyloxy group, an alkoxycarbonyloxy group, an aryloxycarbonyloxy group, an amino group (which may be an alkylamino group, an arylamino group or a heterocyclylamino group), an acylamino group, a ureido group, a sulfamoylamino group, an alkoxycarbonylamino group, an aryloxycarbonylamino group, an alkyl or aryl sulfonylamino group, a heterocyclylsulfonylamino group, a nitro group, an alkyl or aryl thio group, a heterocyclylthio group, an alkyl or aryl sulfonyl group, a heterocyclylsulfonyl group, an alkyl or aryl sulfinyl group, a heterocyclylsulfinyl group, a sulfamoyl group, or a sulfo group. These groups may have a substituent.

G is preferably a hydrogen atom, a halogen atom, an aliphatic group, an aromatic group, a hydroxy group, an alkoxy group, an aryloxy group, an acyloxy group, a heterocyclyloxy group, an amino group (which may be an alkylamino group, an arylamino group or a heterocyclylamino group), an acylamino group, a ureido group, a sulfamoylamino group, an alkoxycarbonylamino group, an aryloxycarbonylamino group, an alkyl or aryl thio group, or a heterocyclylthio group. G is more preferably a hydrogen atom, a halogen atom, an alkyl group, a hydroxy group, an alkoxy group, an aryloxy group, an acyloxy group, an amino group (which may be an alkylamino group, an arylamino group or a heterocyclylamino group), or an acylamino group. G is the most preferably a hydrogen atom, an anilino group, or an acylamino group. These groups may have a substituent.

$R_1$ and $R_2$ are preferably a hydrogen atom, an alkyl group, a halogen atom, an alkoxycarbonyl group, a carboxyl group, a carbamoyl group, a hydroxy group, an alkoxy group, or a cyano group, respectively. These groups may have a substituent.

$R_1$ and $R_5$, or $R_5$ and $R_6$ may bond together to form a 5- or 6-membered ring.

In the case where the groups represented by A, $R_1$, $R_2$, $R_5$, $R_6$ and G has a substituent, examples of such substituents may be the same as the groups represented by each of G, $R_1$ and $R_2$. Further, the dye of the general formula (1) or (2) preferably has an ionic, hydrophilic group on any of A, $R_1$, $R_2$, $R_5$, $R_6$ and G as a substituent.

Examples of such ionic, hydrophilic groups include a sulfo group, a carboxyl group, a phosphono group, quaternary ammonium groups, etc. The ionic, hydrophilic group is preferably a carboxyl group, a phosphono group or a sulfo group, and particularly preferably a carboxyl group or a sulfo group. The carboxyl group, the phosphono group and the sulfo group may form a salt, and examples of counter ions forming the salt include ammonium ions; alkaline metal ions such as a lithium ion, a sodium ion and a potassium ion; and organic cations such as a tetramethylammonium ion, a tetramethylguanidium ion and a tetramethylphosphonium ion.

Examples of preferred heterocycles in the heterocyclic group represented by B include a thiophene ring, a thiazole ring, an imidazole ring, a benzothiazole ring, and a thienothiazole ring. The heterocycles may have a substituent. The heterocyclic group represented by B is preferably a thiophene ring group, a thiazole ring group, an imidazole ring group, a benzothiazole ring group or a thienothiazole ring group, represented by the following general formulae (a) to (e). The general formula (1) corresponds to the general formula (3) when B is a thiophene ring group represented by the general formula (a) and C is an aromatic, nitrogen-containing, 6-membered heterocyclic group represented by the general formula (4).

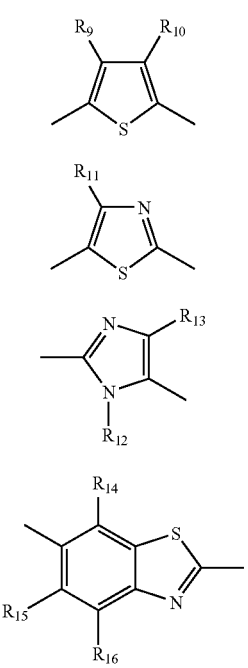

-continued

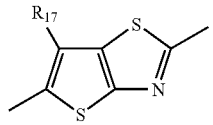

(e)

In the general formulae (a) to (e), $R_9$ to $R_{17}$ have the same meanings as G, $R_1$ and $R_2$ in the general formula (2), respectively.

In the invention, the azo dye of the general formula (1) is particularly preferably a dye represented by the following general formula (5).

General Formula (5)

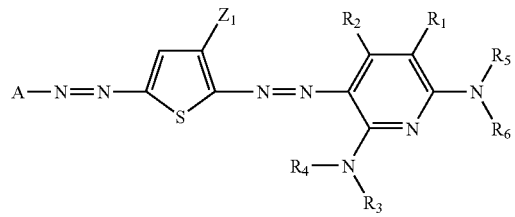

In the general formula (5), $Z_1$ represents an electron-withdrawing group having a Hammett's substituent constant $\sigma_p$ of 0.20 or more. $Z_1$ is preferably an electron-withdrawing group having a value $\sigma_p$ of 0.30 or more, more preferably an electron-withdrawing group having a value $\sigma_p$ of 0.45 or more, and particularly preferably an electron-withdrawing group having a value $\sigma_p$ of 0.60 or more, though the value $\sigma_p$ is preferably 1.0 or less. Specific examples of such electron-withdrawing groups are described hereinafter. Among the examples, preferred are acyl groups with a carbon number of 2 to 20, alkyloxycarbonyl groups with a carbon number of 2 to 20, a nitro group, a cyano group, alkylsulfonyl groups with a carbon number of 1 to 20, arylsulfonyl groups with a carbon number of 6 to 20, carbamoyl groups with a carbon number of 1 to 20, and halogenated alkyl groups with a carbon number of 1 to 20, particularly preferred are a cyano group, alkylsulfonyl groups with a carbon number of 1 to 20, and arylsulfonyl groups with a carbon number of 6 to 20, and the most preferred is a cyano group.

$R_1$, $R_2$, $R_5$ and $R_6$ in the general formula (5) have the same meanings as those in the general formula (2), respectively. $R_3$ and $R_4$ independently represent a hydrogen atom, an aliphatic group, an aromatic group, a heterocyclic group, an acyl group, an alkoxycarbonyl group, an aryloxycarbonyl group, a carbamoyl group, an alkyl or aryl sulfonyl group, or a sulfamoyl group. $R_3$ and $R_4$ are preferably a hydrogen atom, an aromatic group, a heterocyclic group, an acyl group, or an alkyl or aryl sulfonyl group, particularly preferably a hydrogen atom, an aromatic group, or a heterocyclic group, respectively.

The above-mentioned groups in the general formula (5) may have a substituent. Examples of the substituents include those in the general formula (2), those of G, $R_1$ and $R_2$, and ionic, hydrophilic groups.

The Hammett's substituent constant $\sigma_p$ used in the invention is described below. The Hammett rule is an empirical rule proposed to quantitatively treat effects of substituents on reactions or equilibriums of benzene derivatives by L. P. Hammett in 1935, which is widely considered to be appropriate nowadays. A value $\sigma_p$ and a value $\sigma_m$ are used as substituent constants in the Hammett rule. The values can be found in many common books, and described in detail in, for example, *Lange's Handbook of Chemistry*, edited by J. A. Dean, 12th edition, 1979 (McGraw-Hill) and *Kagaku no Ryoiki*, extra edition, No. 122, pages 96 to 103, 1979 (Nanko-do). In the invention, substituents are restricted or explained by the Hammett's substituent constant $\sigma_p$. Of course the restrictions and explanations are applied not only to substituents having known values $\sigma_p$ described in the above books, but also to substituents with values $\sigma_p$, which are not known in the literature and are determined under the Hammett rule. Further, although the dyes represented by the general formula (1) or (2) include dyes other than the benzene derivatives, the value $\sigma_p$ is used without respect to positions of substitution as a scale for indicating electron effects of substituents in the invention. In the invention, the value $\sigma_p$ is used as described above.

Examples of the electron-withdrawing groups having a Hammett's substituent constant $\sigma_p$ of 0.60 or more include a cyano group; a nitro group; alkylsulfonyl groups such as a methanesulfonyl group; and arylsulfonyl groups such as a benzenesulfonyl group.

Examples of the electron-withdrawing groups having a Hammett's substituent constant $\sigma_p$ of 0.45 or more include, in addition to the above groups, acyl groups such as an acetyl group; alkoxycarbonyl groups such as a dodecyloxycarbonyl group; aryloxycarbonyl groups such as a m-chlorophenoxycarbonyl group; alkylsulfinyl groups such as a n-propylsulfinyl group; arylsulfinyl groups such as a phenylsulfinyl group; sulfamoyl groups such as an N-ethylsulfamoyl group and an N,N-dimethylsulfamoyl group; and halogenated alkyl groups such as a trifluoromethyl group.

Examples of the electron-withdrawing groups having a Hammett's substituent constant $\sigma_p$ of 0.30 or more include, in addition to the above groups, acyloxy groups such as an acetoxy group; carbamoyl groups such as an N-ethylcarbamoyl group and an N,N-dibutylcarbamoyl group; halogenated alkoxy groups such as a trifluoromethyloxy group; halogenated aryloxy groups such as a pentafluorophenyloxy group; sulfonyloxy groups such as a methylsulfonyloxy group; halogenated alkylthio groups such as a difluoromethylthio group; aryl groups substituted with 2 or more electron-withdrawing groups having values $\sigma_p$ of 0.15 or more, such as a 2,4-dinitrophenyl group and a pentachlorophenyl group; and heterocyclic groups such as a 2-benzoxazolyl group, a 2-benzothiazolyl group and a 1-phenyl-2-benzimidazolyl group.

Examples of the electron-withdrawing groups having a Hammett's substituent constant $\sigma_p$ of 0.20 or more include halogen atoms in addition to the above groups.

In the azo dye represented by the general formula (3), $R_5$ and $R_6$ are preferably a hydrogen atom, an alkyl group, an aryl group, a heterocyclic group, a sulfonyl group, or an acyl group, more preferably a hydrogen atom, an aryl group, a heterocyclic group, or a sulfonyl group, the most preferably a hydrogen atom, an aryl group, or a heterocyclic group, respectively. Incidentally, at least one of $R_5$ and $R_6$ is not a hydrogen atom.

G is preferably a hydrogen atom, a halogen atom, an alkyl group, a hydroxyl group, an amino group, or an acylamino group, more preferably a hydrogen atom, a halogen atom, an amino group, or an acylamino group, the most preferably a hydrogen atom, an amino group, or an acylamino group.

A is preferably an aromatic group, a pyridine ring group, a pyrazole ring group, an imidazole ring group, an isothiazole ring group, a benzisothiazole ring group, a thiadiazole ring group, a thiazole ring group, a benzothiazole ring group, or a triazole ring group, more preferably an aromatic group, a pyridine ring group, an isothiazole ring group, a benzisothiazole ring group, a thiadiazole ring group, or a benzothiazole ring group, the most preferably an aromatic group, a pyridine ring group, or a benzothiazole ring group.

$B_1$ and $B_2$ are preferably =CR$_1$— and —CR$_2$=, respectively, and $R_1$ and $R_2$ are preferably a hydrogen atom, an alkyl group, a halogen atom, a cyano group, a carbamoyl group, a carboxyl group, a hydroxyl group, an alkoxy group, or an alkoxycarbonyl group, more preferably a hydrogen atom, an alkyl group, a carboxyl group, a cyano group, or a carbamoyl group, respectively.

In the dye represented by the general formula (1), it is preferable that at least one of the substituents is the above-mentioned preferred group. It is more preferable that two or more of the substituents are the above-mentioned preferred group, and it is the most preferable that all the substituents are the above-mentioned preferred group.

Specific examples of the azo dyes represented by the general formula (1) are illustrated below without intention of restricting the dyes usable in the invention. Carboxyl groups, phosphono groups and sulfo groups may form a salt, and examples of counter ions forming the salt include ammonium ions; alkaline metal ions such as a lithium ion, a sodium ion and a potassium ion; and organic cations such as a tetramethylammonium ion, a tetramethylguanidium ion and a tetramethylphosphonium ion.

TABLE 1

A—N=N—B—N=N—C

| | A | B | C |
|---|---|---|---|
| (a-1) | phenyl | 2,5-dimethyl-3-cyanothiophene | 4-methyl-3-cyano-pyridine with two (phenyl-SO$_3$H)-amino substituents |

TABLE 1-continued

A—N=N—B—N=N—C

| | A | B | C |
|---|---|---|---|
| (a-2) | 2-methylphenyl | 2,5-dimethyl-3-cyanothienyl | 4-methyl-3-cyano-5-methyl-2-(4-sulfophenylamino)-6-(4-sulfophenylamino)pyridinyl |
| (a-3) | 2-chlorophenyl | 2,5-dimethyl-3-cyanothienyl | 4-methyl-3-cyano-5-methyl-2-(2-sulfophenylamino)-6-(2-sulfophenylamino)pyridinyl |
| (a-4) | 4-cyanophenyl | 2,5-dimethyl-3-cyanothienyl | 4-methyl-3-cyano-5-methyl-2-(sulfophenylamino)-6-(sulfophenylamino)pyridinyl |
| (a-5) | 4-nitrophenyl | 2,5-dimethyl-3-cyanothienyl | 4-methyl-3-cyano-5-methyl-2-(4-sulfophenylamino)-6-(4-sulfophenylamino)pyridinyl |
| (a-6) | 3-pyridyl | 2,5-dimethyl-3-cyanothienyl | 4-methyl-3-cyano-5-methyl-2-(2-sulfophenylamino)-6-(2-sulfophenylamino)pyridinyl |

TABLE 2
A—N=N—B—N=N—C
| | A | B | C |
|---|---|---|---|
| (b-1) | 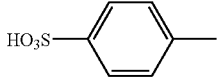 | 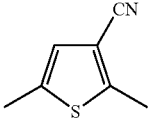 | 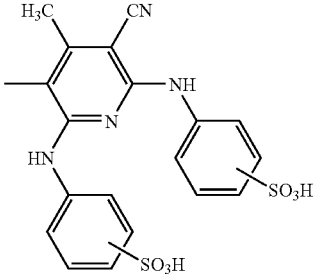 |
| (b-2) | 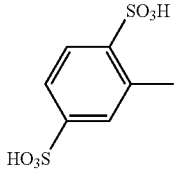 | 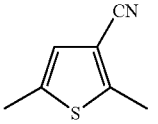 | 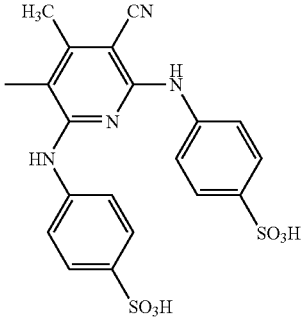 |
| (b-3) | 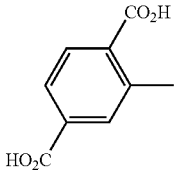 | 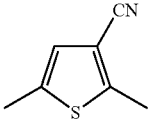 | 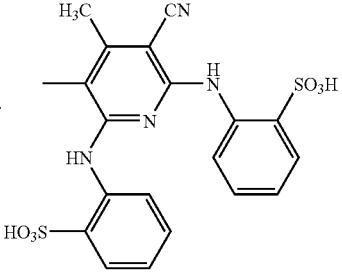 |
| (b-4) | 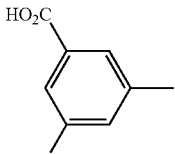 | 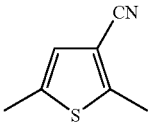 | 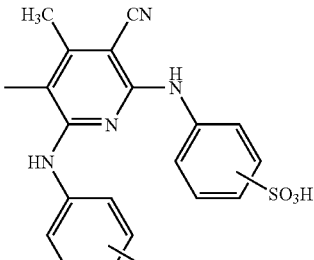 |
| (b-5) | 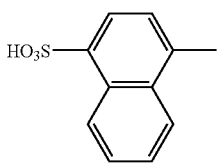 | 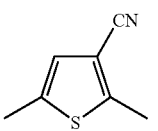 | 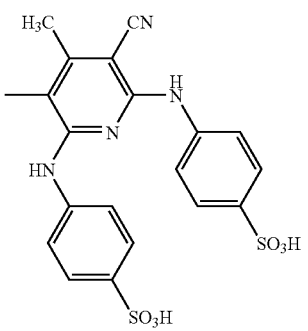 |

TABLE 2-continued
A—N=N—B—N=N—C
| | A | B | C |
|---|---|---|---|
| (b-6) | 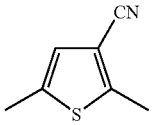 | 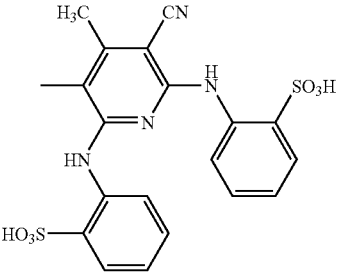 | 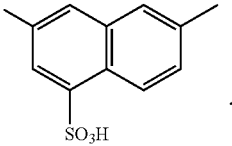 |
| (b-7) | 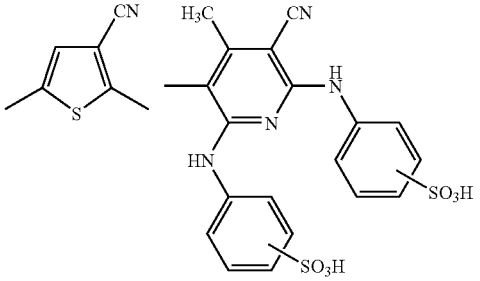 | 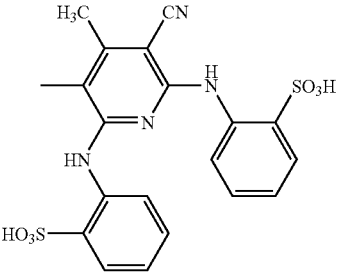 | 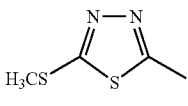 |
TABLE 3
A—N=N—B—N=N—C
| | A | B | C |
|---|---|---|---|
| (c-1) | 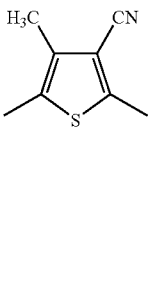 | 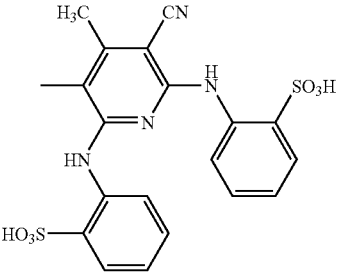 | 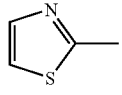 |
| (c-2) | 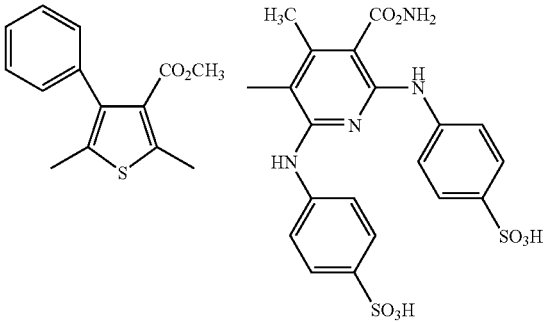 | | |

TABLE 3-continued
| | A | B | C |
|---|---|---|---|
| (c-3) | 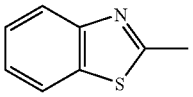 | 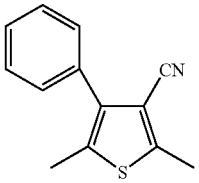 | 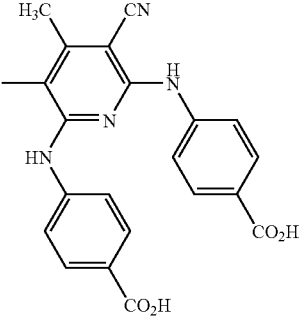 |
| (c-4) | 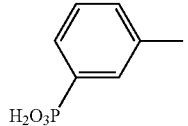 | 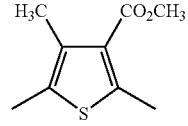 | 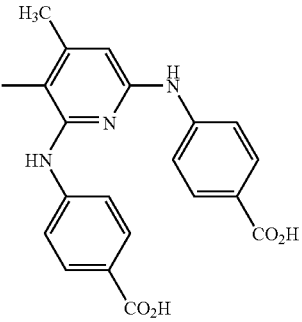 |
| (c-5) | 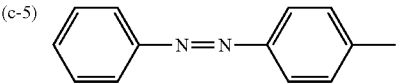 | 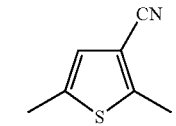 | 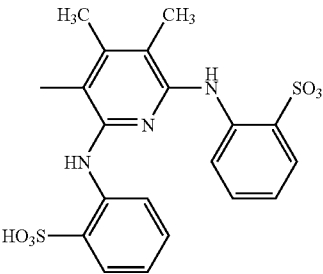 |
TABLE 4
| | A | B | C |
|---|---|---|---|
| (d-1) | 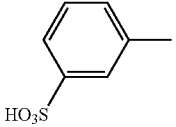 | 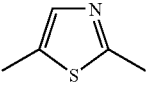 | 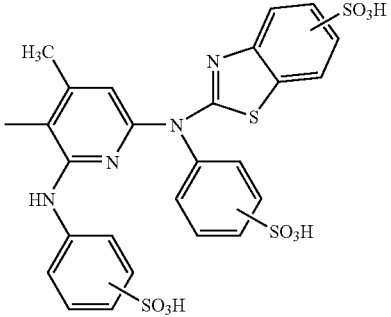 |

TABLE 4-continued
A—N=N—B—N=N—C
| | A | B | C |
|---|---|---|---|
| (d-2) | 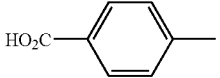 | 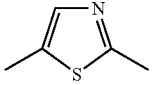 | 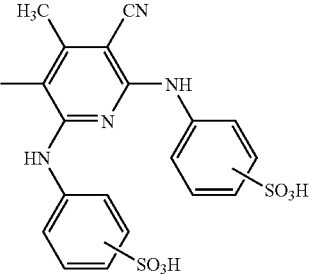 |
| (d-3) | 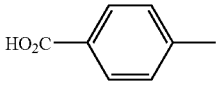 | 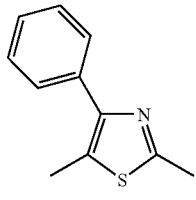 | 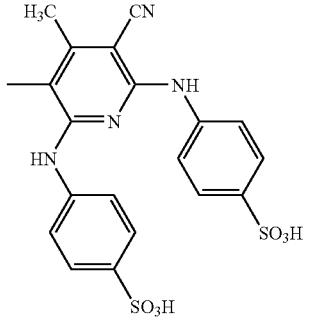 |
| (d-4) | 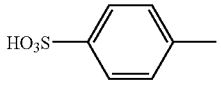 | 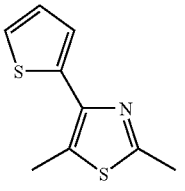 | 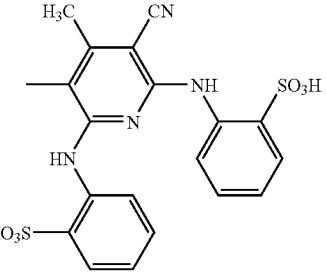 |
| (d-5) | 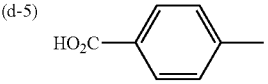 | 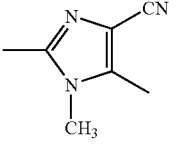 | 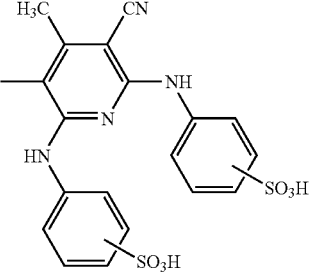 |
| (d-6) | 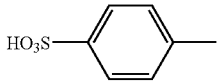 | 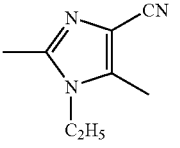 | 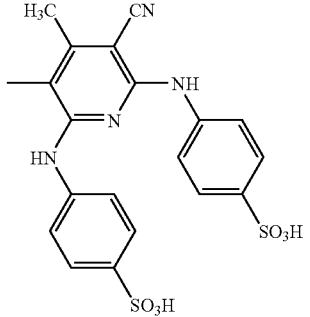 |

TABLE 5
A—N=N—B—N=N—C
| | A | B | C |
|---|---|---|---|
| (e-1) | 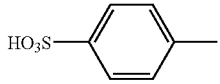 | 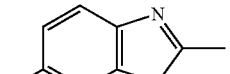 | 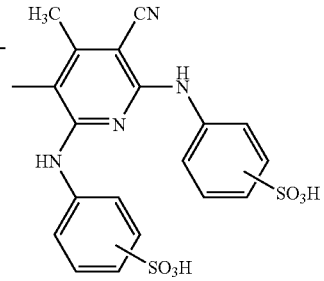 |
| (e-2) | 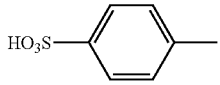 | 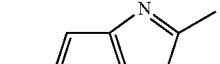 | 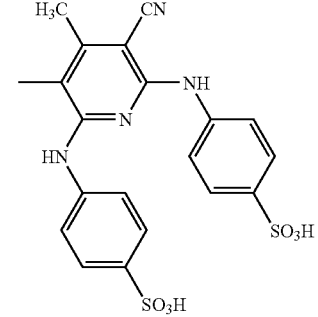 |
TABLE 6
A—N=N—B—N=N—C
| | A | B | C |
|---|---|---|---|
| (f-1) | 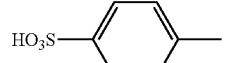 | 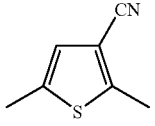 | 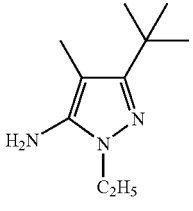 |
| (f-2) | 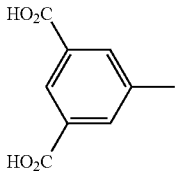 | 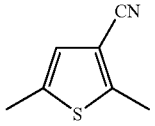 | 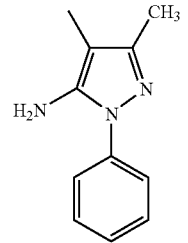 |

TABLE 6-continued

A—N=N—B—N=N—C

| | A | B | C |
|---|---|---|---|
| (f-3) | naphthalene with HO₃S, SO₃H, and methyl substituents | thiophene with CN, and two methyl groups | triazine linked to aminomethylphenylpyrazole and two (HN-phenyl with CO₂H, CO₂H) groups |
| (f-4) | phenyl with H₂O₃P | thiazole with H₃C, and two methyl groups | pyrazole with methyl, tert-butyl, H₂N, and C₂H₅ substituents |

The dyes represented by the general formula (1), (2), (3) or (5) may be synthesized by a coupling reaction between a diazo component and a coupler, for example, by a typical method described in Japanese Patent Application No. 2002-113460.

The dye (L) may be used singly for the black ink when the dye (L) can singly provide a high-image quality sharp black color, in which a color tone of any of B, G and R is hardly conspicuous, not depending on light sources for observation. The dye (L) is usually used in combination with a dye capable of covering a region in which the dye (L) has a low absorbancy. In general, the dye (L) is preferably used with a dye or a pigment absorbing mainly a light in a yellow region, to obtain the preferred black color. Usable as such yellow dyes may be direct dyes, acidic dyes, etc., typically including azo dyes and azomethine dyes. Usable as such pigments may be common pigments having a pigment number, which may be used as a water-based dispersion with the dye (L). It is particularly preferred that a dye represented by the general formula (1) is used with the dye (L) as the above-mentioned short wavelength dye (S).

Among the dyes represented by the general formula (1), preferred for use as the short wavelength dye (S) are such azo dyes as m and n in the general formula (1) are 0. In such azo dyes, A and C are preferably an aromatic heterocyclic group, respectively. Next preferred are such azo dyes as m and n are 1.

In any case, the oxidation potential (Eox) of the dye is preferably more than 1.0 V (vs SCE), particularly preferably 1.2 V (vs SCE) or more.

The dye (L) may be used with a further dye to produce the black ink.

The amount of the dye (L) and the dye (S) that is used if necessary (hereinafter referred to as black dyes of the invention) is 0.2 to 25% by mass, preferably 0.5 to 15% by mass, of the black ink for ink-jet recording of the invention. The mass ratio of the dye (S) to total dyes may be 1 to 80% by mass.

In the black ink of the invention, another dye may be used with the black dyes of the invention to obtain a full-color image or to control the color tone. Examples of such dyes used with the black dyes of the invention are described below. Further, the black ink of the invention preferably comprises the dye (S) having a $\lambda$max within a range of 350 to 500 nm as described above. Yellow dyes and yellow pigments to be hereinafter described are preferably used as the dye (S).

Examples of the yellow dyes include aryl or heteryl azo dyes having a phenol compound, a naphthol compound, an aniline compound, a pyrazolone compound, a pyridone compound or an open-chain active methylene compound as a coupling component; azomethine dyes having an open-chain active methylene compound as a coupling component; methine dyes such as benzylidene dyes and monomethin-eoxonol dyes; and quinone dyes such as naphthoquinone dyes and anthraquinone dyes. The yellow dyes further include quinophthalone dyes, nitro-nitroso dyes, acridine dyes, acridinone dyes, etc. The yellow dyes may be such that shows a yellow color only after a part of the chromophore is dissociated. In such yellow dyes, the counter cation may be an inorganic cation such as an alkaline metal ion and an ammonium ion; an organic cation such as a pyridinium ion and a quaternary ammonium ion; or a polymer cation having a moiety composed thereof.

Examples of magenta dyes include aryl or heteryl azo dyes having a phenol compound, a naphthol compound or an aniline compound as a coupling component; azomethine dyes having a pyrazolone compound or a pyrazolotriazole compound as a coupling component; methine dyes such as arylidene dyes, styryl dyes, merocyanine dyes and oxonol dyes; carbonium dyes such as diphenylmethane dyes, triphenylmethane dyes and xanthene dyes; quinone dyes such as naphthoquinone dyes, anthraquinone dyes and anthrapyridone dyes; condensed polycyclic dyes such as dioxazine dyes; etc. The magenta dyes may be such that shows a magenta color only after a part of the chromophore is dissociated. In such magenta dyes, the counter cation may be an inorganic cation such as an alkaline metal ion and an ammonium ion; an organic cation such as a pyridinium ion and a quaternary ammonium ion; or a polymer cation having a moiety composed thereof.

Examples of cyan dyes include azomethine dyes such as indoaniline dyes and indophenol dyes; polymethine dyes such as cyanine dyes, oxonol dyes and merocyanine dyes; carbonium dyes such as diphenylmethane dyes, triphenylmethane dyes and xanthene dyes; phthalocyanine dyes; anthraquinone dyes; aryl or heteryl azo dyes having a phenol compound, a naphthol compound or an aniline compound as a coupling component; and indigo dyes and thioindigo dyes. The cyan dyes may be such that shows a cyan color only after a part of the chromophore is dissociated. In such cyan dyes, the counter cation may be an inorganic cation such as an alkaline metal ion and an ammonium ion; an organic cation such as a pyridinium ion and a quaternary ammonium ion; or a polymer cation having a moiety composed thereof.

Further, a black dye such as a polyazo dye, other than the black dyes of the invention, may be used in the invention.

Further, the black dyes of the invention may be used with a water-soluble dye such as a direct dye, an acidic dye, a food dye, a basic dye and a reactive dye. Preferred examples of such water-soluble dyes include:

C.I. Direct Reds 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, and 247;

C.I. Direct Violets 7, 9, 47, 48, 51, 66, 90, 93, 94, 95, 98, 100, and 101;

C.I. Direct Yellows 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, and 163;

C.I. Direct Blues 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 243, 214, 218, 225, 229, 236, 237, 244, 248, 249, 251, 252, 264, 270, 280, 288, 289, and 291;

C.I. Direct Blacks 9, 17, 19, 22, 32, 51, 56, 62, 69, 77, 80, 91, 94, 97, 108, 112, 113, 114, 117, 118, 121, 122, 125, 132, 146, 154, 166, 168, 173, and 199;

C.I. Acid Reds 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, and 397;

C.I. Acid Violets 5, 34, 43, 47, 48, 90, 103, and 126;

C.I. Acid Yellows 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227;

C.I. Acid Blues 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, and 326;

C.I. Acid Blacks 7, 24, 29, 48, 52:1, and 172;

C.I. Reactive Reds 3, 13, 17, 19, 21, 22, 23, 24, 29, 35, 37, 40, 41, 43, 45, 49, and 55;

C.I. Reactive Violets 1, 3, 4, 5, 6, 7, 8, 9, 16, 17, 22, 23, 24, 26, 27, 33, and 34;

C.I. Reactive Yellows 2, 3, 13, 14, 15, 17, 18, 23, 24, 25, 26, 27, 29, 35, 37, 41, and 42;

C.I. Reactive Blues 2, 3, 5, 8, 10, 13, 14, 15, 17, 18, 19, 21, 25, 26, 27, 28, 29, and 38;

C.I. Reactive Blacks 4, 5, 8, 14, 21, 23, 26, 31, 32, and 34;

C.I. Basic Reds 12, 13, 14, 15, 18, 22, 23, 24, 25, 27, 29, 35, 36, 38, 39, 45, and 46;

C.I. Basic Violets 1, 2, 3, 7, 10, 15, 16, 20, 21, 25, 27, 28, 35, 37, 39, 40, and 48;

C.I. Basic Yellows 1, 2, 4, 11, 13, 14, 15, 19, 21, 23, 24, 25, 28, 29, 32, 36, 39, and 40;

C.I. Basic Blues 1, 3, 5, 7, 9, 22, 26, 41, 45, 46, 47, 54, 57, 60, 62, 65, 66, 69, and 71;

C.I. Basic Black 8; etc.

The black dyes of the invention may be used with a pigment.

Commercially-available pigments and known pigments described in various literatures may be used for the black ink of the invention. The literatures include *Color Index*, The Society of Dyers and Colourists; *Kaitei Shinpan Ganryo Binran*, Nippon Ganryo Gijutsu Kyokai, 1989; *Saishin Ganryo Oyo Gijutsu*, CMC Publishing Co., Ltd., 1986; *Insatsu Inki Gijutsu*, CMC Publishing Co., Ltd., 1984; W. Herbst and K. Hunger, *Industrial Organic Pigments*, VCH Verlagsgesellschaft, 1993; etc. Specific examples of such organic pigments include azo pigments such as azo lake pigments, insoluble azo pigments, condensed azo pigments, and chelate azo pigments; polycyclic pigments such as phthalocyanine pigments, anthraquinone pigments, perylene pigments, perynone pigments, indigo pigments, quinacridon pigments, dioxazine pigments, iso-indolinone pigments, quinophthalone pigments, and diketopyrrolopyrrole pigments; dyeing lake pigments (lake pigments of acidic or basic dyes); azine pigment; etc. Specific examples of such inorganic pigments include yellow pigments such as C.I. Pigment Yellows 34, 37, 42, and 53; red pigments such as C.I. Pigment Reds 101, and 108; blue pigments such as C.I. Pigment Blue 27, 29, and 17:1; black pigments such as C.I. Pigment Black 7 and magnetites; and white pigments such as C.I. Pigment Whites 4, 6, 18, and 21.

Pigments having a color tone preferred for forming an image are described below.

Examples of preferred blue or cyan pigments include phthalocyanine pigments; anthraquinone-based, indanthrone pigments such as C.I. Pigment Blue 60; and dyeing lake pigments such as triarylcarbonium pigments. Among them, the most preferred are phthalocyanine pigments, and preferred examples thereof include copper phthalocyanines such as C.I. Pigment Blues 15:1, 15:2, 15:3, 15:4, and 15:6; monochloro or low chlorinated copper phthalocyanines; aluminum phthalocyanines described in EP No. 860475; the non-metal phthalocyanine of C.I. Pigment Blue 16; phthalocyanines having a central metal of Zn, Ni or Ti; etc. Particularly preferred among them are C.I. Pigment Blues 15:3 and 15:4, and the aluminum phthalocyanines.

Examples of preferred red or violet pigments include azo pigments, preferred examples thereof including C.I. Pigment Reds 3, 5, 11, 22, 38, 48:1, 48:2, 48:3, 48:4, 49:1, 52:1, 53:1, 57:1, 63:2, 144, 146 and 184, and particularly preferred examples thereof including C.I. Pigment Reds 57:1, 146 and 184; quinacridon pigments, preferred examples thereof including C.I. Pigment Reds 122, 199, 202, 207 and 209, and C.I. Pigment Violets 19 and 49, and particularly preferred examples thereof including C.I. Pigment Red 122; dyeing lake triarylcarbonium pigments with preferred examples including xanthene pigments of C.I. Pigment Red 81:1, and C.I. Pigment Violets 1, 2, 3, 27 and 39; dioxazine pigments such as C.I. Pigment Violets 23 and 37; diketopyrrolopyrrole pigments such as C.I. Pigment Red 254; perylene pigments such as C.I. Pigment Violet 29; anthraquinone pigments such as C.I. Pigment Violets 5:1, 31 and 33; and thioindigo pigments such as C.I. Pigment Reds 38 and 88.

Examples of preferred yellow pigments include azo pigments, preferred examples thereof including monoazo pigments of C.I. Pigment Yellows 1, 3, 74 and 98, disazo pigments of C.I. Pigment Yellows 12, 13, 14, 16, 17 and 83, polyazo pigments of C.I. Pigment Yellows 93, 94, 95, 128 and 155, and benzimidazolone pigments of C.I. Pigment Yellows 120, 151, 154, 156 and 180, and particularly preferred among them being such that benzidine compounds are not used as a material; iso-indoline or iso-indolinone pigments with preferred examples including C.I. Pigment Yellows 109, 110, 137, 139, etc.; quinophthalone pigments with preferred examples including C.I. Pigment Yellow 138, etc.; and flavanthrone pigments such as C.I. Pigment Yellow 24.

Examples of preferred black pigment include inorganic pigments with preferred examples including carbon blacks and magnetites, and aniline blacks.

Further, orange pigments such as C.I. Pigment Oranges 13 and 16, and green pigments such as C.I. Pigment Green 7 may be used in the invention.

The pigments may be used barely without any treatment, and may be subjected to a surface treatment to use in the black ink of the invention. Methods for the surface treatment include methods of coating a surface of a pigment with a resin or a wax; methods of attaching a surfactant to a pigment; methods of connecting a reactive substance (for example, a silane coupling agent, an epoxy compound, a polyisocyanate compound, a radical generated from a diazonium salt, etc.) to a surface of a pigment; etc. These methods are described in (1) *Kinzoku Sekken no Seishitsu to Oyo*, Saiwai Shobo; (2) *Insatsu Inki Gijutsu*, CMC Publishing Co., Ltd., 1984; (3) *Saishin Ganryo Oyo Gijutsu*, CMC Publishing Co., Ltd., 1986; (4) U.S. Pat. Nos. 5,554,739 and 5,571,311; and (5) JP-A-9-151342, JP-A-10-140065, JP-A-10-292143 and JP-A-11-166145.

Particularly, self-dispersible pigments prepared by methods described in USPs of (4) in which a diazonium salt is reacted with a carbon black, and capsulated pigments prepared by methods described in JPs of (5) are effective because the black ink using such a pigment is excellent in dispersion stability without an additional dispersing agent.

In the black ink of the invention, a dispersing agent may be used to disperse the pigment. The dispersing agent may be selected depending on the pigment from known ones such as surfactant-type low molecular weight dispersing agents and high molecular weight dispersing agents. Examples of the dispersing agents are described in JP-A-3-69949, EP No. 549486, etc. A pigment derivative referred to as a synergist may be used with the dispersing agent, to accelerate adsorption of the dispersing agent onto the pigment.

The particle diameter of the pigment used for the black ink of the invention is preferably 0.01 to 10 µm, more preferably 0.05 to 1 µm, after the dispersion.

The pigment may be dispersed by a known dispersion method, which is usually used in production of inks or toners. Examples of dispersing apparatuses include vertical or horizontal type agitator mills, atoliters, colloid mills, ball mills, three-axis roll mills, pearl mills, super mills, impellers, dispersers, KD mills, dynatrons, pressurizing kneaders, etc. The apparatuses are described in detail in *Saishin Ganryo Oyo Gijutsu*, CMC Publishing Co., Ltd., 1986.

The transition metal ion content of the black ink for ink-jet recording of the invention is 0.1 mmol/l or less. When a water-soluble dye is used in the black ink, the dye is often converted into a metal salt to increase the solubility. The metal ion, the counter cation of the metal salt, is preferably an alkaline metal ion or an alkaline earth metal ion. The metal ion is more preferably an alkaline metal ion, particularly preferably a lithium ion, a sodium ion, or a potassium ion. The black ink containing no transition metal ion may be prepared, such that the dye is synthesized without using metal vessels; such that the dye is converted into the alkaline metal salt after the reaction mixture is put into a metal ion-free state; such that a transition metal-masking agent is added to remove transition metal ions in the synthesis; or such that the produced dye is subjected to ion-exchange; etc.

It is also important to remove transition metal ions from a solvent to be used for preparation of the ink composition. In particular, water, a main solvent of the black ink, is preferably a deionized water.

The transition metal ion content of the black ink of the invention is 0.1 mmol/l or less, preferably 0.01 mmol/l or less, particularly preferably 0.001 mmol/l or less.

The black ink for ink-jet recording of the invention may be prepared by dissolving or dispersing the black dye of the invention and an organic solvent in the aqueous medium, preferably with the surfactant. In the invention, the term "aqueous medium" means water to which a solvent such as a water-miscible organic solvent, a wetting agent, a stabilizing agent, an antiseptic agent, etc. may be added if necessary.

In the case where the dye is water-soluble, it is preferable that the dye is first dissolved in water. Then, solvents or additives may be added thereto, dissolved, and mixed, to prepare a uniform ink liquid.

The dissolution may be achieved by a stirring method, an ultrasonic wave irradiation method, a shaking method, etc. Among them, the stirring method is particularly preferred. Various stirring methods known in the field may be used in the invention, and examples thereof include fluid agitations and methods using a reversing agitator or a dissolver to utilize shearing force. Stirring methods, which use a magnetic-stirring bar, etc. to provide a shearing force with a bottom of a vessel, are also preferably used in the invention.

The physical properties of the black ink may be controlled by adding a surfactant, to improve the discharging stability of the ink, to increase the water resistance of the image, or to preventing blurs of the printed ink, etc.

Examples of such surfactants include anionic surfactants such as sodium dodecyl sulfate, sodium dodecyloxysulfonate and sodium alkylbenzenesulfonates; cationic surfactants such as cetylpyridinium chloride, trimethylcetylammonium chloride and tetrabutylammonium chloride; nonionic surfactants such as polyoxyethylene nonyl phenyl ether, polyoxyethylene naphtyl ether and polyoxyethylene octyl phenyl ether; etc. Among the surfactants, the nonionic surfactants are preferable.

The mass ratio of the surfactant to the black ink is 0.001 to 20% by mass, preferably 0.005 to 10% by mass, more preferably 0.01 to 5% by mass.

Examples of the water-miscible organic solvents usable in the invention include alcohols such as methanol, ethanol, propanol, isopropanol, butanol, isobutanol, sec-butanol, t-butanol, pentanol, hexanol, cyclohexanol and benzyl alcohol; polyhydric alcohols such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol; glycol derivative such as ethylene glycol monomethyl ether, ethyleneglycol monoethyl ether, ethyleneglycol monobutyl ether, diethyleneglycol monomethyl ether, diethyleneglycol monobutyl ether, propyleneglycol monomethyl ether, propyleneglycol monobutyl ether, dipropyleneglycol monomethyl ether, triethyleneglycol monomethyl ether, ethyleneglycol diacetate, ethyleneglycol monomethyl ether acetate, triethyleneglycol monomethyl ether, triethyleneglycol monoethyl ether, and ethyleneglycol monophenyl ether; amines such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine and tetramethylpropylenediamine; and other polar solvents such as formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone. These water-miscible organic solvents may be used in combination with each other.

The total amount of the water-miscible organic solvents is preferably 5 to 60% by mass, particularly preferably 10 to 45% by mass, of the black ink.

In the case where the black dye of the invention is oil soluble, the oil-soluble dye may be dissolved in a high boiling organic solvent, and be emulsified and dispersed in the aqueous medium, to prepare the black ink.

The boiling point of the high boiling organic solvent used in the invention is 150° C. or higher, preferably 170° C. or higher.

Examples of such the high boiling organic solvents include phthalates such as dibutyl phthalate, dioctyl phthalate, dicyclohexyl phthalate, di-2-ethylhexyl phthalate, decyl phthalate, bis(2,4-di-tert-amylphenyl)isophthalate, and bis(1,1-diethylpropyl)phthalate; phosphate or phosphonate esters such as diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, and di-2-ethylhexylphenyl phosphate; benzoates such as 2-ethylhexyl benzoate, 2,4-dichloro benzoate, dodecyl benzoate, and 2-ethylhexyl p-hydroxybenzoate; amides such as N,N-diethyldodecanamide and N,N-diethyllaurylamide; alcohols and phenols such as isostearyl alcohol and 2,4-di-tert-amylphenol; aliphatic esters such as dibutoxyethyl succinate, di-2-ethylhexyl succinate, 2-hexyldecyl tetradecanate, tributyl citrate, diethyl azelate, isostearyl lactate, and trioctyl citrate; aniline derivatives such as N,N-dibutyl-2-butoxy-5-tert-octylaniline; chlorinated paraffins such as paraffins having chlorine contents of 10 to 80%; trimesates such as tributyl trimesate; dodecylbenzene; diisopropylnaphthalene; phenols such as 2,4-di-tert-amylphenol, 4-dodecyloxyphenol, 4-dodecyloxycarbonylphenol, and 4-(4-dodecyloxyphenylsulfonyl) phenol; carboxylic acids such as 2-(2,4-di-tert-amylphenoxy)butyric acid, and 2-ethoxyoctadecanoic acid; and alkylphosphoric acids such as di-2-ethylhexyl phosphoric acid and diphenylphosphoric acid. The amount of the high boiling organic solvent is 0.01 to 3.0 equivalent by mass, preferably 0.01 to 1.0 equivalent by mass, based on 1 equivalent by mass of the oil-soluble dye.

The high boiling organic solvents may be used singly or as a mixture of a plurality of solvents, such as a mixture of tricresyl phosphate and dibutyl phthalate, a mixture of trioctyl phosphate and di(2-ethylhexyl) sebacate, and a mixture of dibutyl phthalate and poly(N-t-butylacrylamide).

Further examples of the high boiling organic solvents usable in the invention and/or methods for synthesizing the high boiling organic solvents are described in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639; EP Nos. 276,319A, 286,253A, 289,820A, 309,158A, 309,159A, 309,160A, 509, 311A and 510,576A; East Germany Patent Nos. 147,009, 157,147, 159,573 and 225,240A; British Patent No. 2,091, 124A; JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1501, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338; etc.

The amount of the high boiling organic solvent is 0.01 to 3.0 equivalent by mass, preferably 0.01 to 1.0 equivalent by mass, based on 1 equivalent by mass of the oil-soluble dye.

In the invention, the oil-soluble dye and the high boiling organic solvent are emulsified and dispersed in the aqueous medium. In the emulsification and dispersion, a low boiling organic solvent may be used in some cases from the viewpoint of the emulsification property. The low boiling organic solvent has a boiling point of approximately 30 to 150° C. under the atmospheric pressure. Examples of preferred low boiling organic solvents include esters such as ethyl acetate, butyl acetate, ethyl propionate, β-ethoxyethyl acetate, and methyl cellosolve acetate; alcohols such as isopropyl alcohol, n-butyl alcohol, and sec-butyl alcohol; ketones such as methyl isobutyl ketone, methyl ethyl ketone, and cyclohexanone; amides such as dimethylformamide, and N-methylpyrrolidone; ethers such as tetrahydrofuran and dioxane; etc. The low boiling organic solvent is not limited to the examples.

In the emulsification and dispersion, an oil phase, which is prepared by dissolving the dye in a mixed solvent of the high boiling organic solvent and the optionally added low boiling organic solvent, is dispersed in a water phase mainly composed of water to generate small oil droplets of the oil phase. In this process, a surfactant, a wetting agent, a dye-stabilizing agent, an emulsification-stabilizing agent, an antiseptic agent, an antimold, etc. may be added to the water phase and/or the oil phase if necessary.

Although the emulsification is usually carried out by a method of adding the oil phase to the water phase, a so-called, phase inversion emulsification method, in which the water phase is added to the oil phase dropwise, may be preferably used in the invention. The emulsification methods may be used also in the case where the black dye of the invention is water-soluble and a component is oil-soluble.

Various surfactants may be used in the emulsification and dispersion. Preferred examples thereof include anionic surfactants such as fatty acid salts, alkyl sulfate ester salts, alkylbenzenesulfonate salts, alkylnaphthalenesulfonate salts, dialkylsulfosuccinate salts, alkylphosphate salts, naphthalenesulfonic acid-formalin condensates, and polyoxyethylenealkylsulfate salts; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, glycerin fatty acid esters, and oxyethylene-oxypropylene block copolymers. Further, the preferred examples include an acetylene-based polyoxyethylene oxide surfactant of SURFYNOLS (Air Products and Chemicals, Inc.), and aminooxide type ampholytic surfactants such as N,N-dimethyl-N-alkyl-amineoxide. Furthermore, surfactants described in JP-A-59-157636, pages (37) to (38) and *Research Disclosure*, No. 308119 (1989) may be used in the invention.

A water-soluble polymer may be added with the surfactant, to stabilize the emulsion immediately after the emulsification. Examples of preferred water-soluble polymers include polyvinyl alcohols, polyvinyl pyrrolidones, polyethylene oxides, polyacrylic acids, polyacrylamides and copolymers thereof. Further, a natural water-soluble polymer such as casein and gelatin is also preferably used. To stabilize the dye dispersion, a polymer substantially insoluble in the aqueous medium may be used with the water-soluble polymer. Examples of such polymers substantially insoluble in the aqueous medium include vinyl polymers such as prepared by polymerization of acrylate esters, methacrylate esters, vinyl esters, acrylamides, methacrylamides, olefins, styrenes, vinyl ethers, or acrylonitriles; polyurethanes; polyesters; polyamides; polyureas; polycarbonates; etc. The polymer substantially insoluble in the aqueous medium preferably has $-SO_3^-$ or $-COO^-$. The mass ratio of the polymer substantially insoluble in the aqueous medium to the high boiling organic solvent is preferably 20% by mass or less, more preferably 10% by mass or less.

When the oil-soluble dye and the high boiling organic solvent are emulsified and dispersed to obtain a water ink, it is particularly important to control the particle size. The average particle size is reduced to improve the color purity and the color density of the ink-jet image. The volume-average particle diameter is preferably 1 μm or less, more preferably 5 to 100 nm.

The volume-average particle diameter and the particle size distribution of the dispersion particles may be easily measured by a known method such as static light scattering methods, dynamic light scattering methods, centrifugal sedimentation methods, and methods described in *Jikken Kagaku Koza*, 4th edition, pages 417 to 418. For example, the ink is diluted with a distilled water such that the particle concentration becomes 0.1 to 1% by mass, and the diluted ink is measured by a commercially-available, volume-average particle diameter analyzer (e.g. MICROTRAC UPA manufactured by NIKKISO Co., Ltd.) with ease. Dynamic light scattering methods utilizing laser Doppler effect can measure smaller particle diameter, to be particularly preferred.

The volume-average particle diameter is an average particle diameter weighted with the particle volume, and is such that the total of a product of diameter and volume of each particle is divided by the total volume of the particles. The volume-average particle diameter is described in Soichi Muroi, *Chemistry of Synthetic Latexes* (*Kobunshi Ratekkusu No Kagaku*), Kobunshi Kankokai, page 119.

It has been clear that the presence of coarse particles also remarkably affects the printing performance. Thus, the coarse particles obstruct a print head nozzle or form an ink stain even if the nozzle is not obstructed, and thereby cause the ink discharge with imperfection or kink, to remarkably affect the printing performance. To prevent this affect, it is important to keep a number of particles having a diameter of 5 μm or more per 1 μl of the ink within 10 or less, and to keep a number of particles having a diameter of 1 μm or more per 1 μl of the ink within 1000 or less.

The coarse particles may be removed by a known method such as a centrifugation method and a microfiltration method. The removal may be carried out immediately after the emulsification and dispersion, or after addition of various additives such as a wetting agent and a surfactant to the emulsion and immediately before charging the emulsion into an ink cartridge.

A mechanical emulsifying apparatus may be used to effectively reduce the average particle size and to remove the coarse particles.

The emulsifying apparatus may be a known one such as a simple stirrer, an impeller stirring system, an in-line stirring system, a mill system (e.g. a colloid mill), and an ultrasonic wave system. A high-pressure homogenizer is particularly preferred as the emulsifying apparatus.

The mechanism of the high-pressure homogenizer is described in detail in U.S. Pat. No. 4,533,254, JP-A-6-47264, etc. Commercially-available, high-pressure homogenizers include Gaulin Homogenizer (A. P. V. GAULIN INC.), Microfluidizer (MICROFLUIDEX INC.), Artimizer (Sugino Machine Co., Ltd.), etc.

Further, a high-pressure homogenizer with a mechanism of preparing the fine particles in an extra-high pressure jet stream, such as recently described in U.S. Pat. No. 5,720,551, is particularly effective for the emulsification and dispersion of the invention. Examples of such high-pressure homogenizers using the extra-high pressure jet streams include DeBEE2000 (BEE INTERNATIONAL LTD.)

The pressure applied by a high-pressure emulsifying apparatus is 50 MPa or more, preferably 60 MPa or more, more preferably 180 MPa or more.

A plurality of emulsifying apparatuses are particularly preferably used in combination, for example, the emulsion may be treated with a high-pressure homogenizer after the emulsification by a stirring emulsification apparatus. Further, also preferred is a method where after the particles are once emulsified and dispersed with by the emulsifying apparatus and the additives such as a wetting agent and a surfactant are added thereto, the emulsion is allowed to pass through the high-pressure homogenizer again before the ink is charged into a cartridge.

In the case of using the low boiling organic solvent in addition to the high boiling organic solvent, the low boiling organic solvent is preferably removed from the viewpoints of the stability of the emulsion, and the safety and sanitation. The method for removing the low boiling organic solvent may be selected from various known methods depending on the kind of the solvent. Examples of such known methods include evaporation methods, vacuum evaporation methods and ultrafiltration methods. The low boiling organic solvent is preferably removed as soon as possible after the emulsification.

Methods for preparing ink-jet inks, described in detail in JP-A-5-148436, JP-A-5-295312, JP-A-7-97541, JP-A-7-82515, and JP-A-7-118584, may be used for preparation of the black ink of the invention.

Functional additives may be added to the black ink for ink-jet recording of the invention, to provide various functions for the ink. Examples of such functional additives include the above-described various solvents; anti-drying agents for preventing an ink nozzle from being obstructed with a dried ink; penetration-accelerating agents for more effectively allowing the ink to penetrate paper; ultraviolet absorbers; antioxidants; viscosity-controlling agents; surface tension-controlling agents; dispersing agents; dispersion stabilizers; antimolds; corrosion inhibitors; pH-adjusting agents; antifoaming agents; chelating agents; etc. The black ink of the invention may use a proper amount of such functional additives appropriately selected. The functional additives may have a plurality of functions. In the compounding ratios of the functional additives to be hereinafter described, an additive with a plurality of functions is counted in each functional additive.

The anti-drying agent used in the invention is preferably a water-soluble organic solvent lower in a vapor pressure than water. Specific examples thereof include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, trimethylolpropane, etc.; lower alkyl ethers of polyhydric alcohols such as ethylene glycol monomethyl (or monoethyl) ether, diethylene glycol monomethyl (or monoethyl) ether, and triethylene glycol monomethyl (or monobutyl) ether; heterocyclic compounds such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; multifunctional compounds such as diacetone alcohol and diethanolamine; and urea derivatives. Among them, polyhydric alcohols such as glycerin and diethylene glycol are more preferred. The anti-drying agents may be used alone or in combination with each other. The mass ratio of the anti-drying agents to the ink is preferably 10 to 50% by mass.

Examples of the penetration-accelerating agents used in the invention include alcohols such as ethanol, isopropanol, butanol, di- or tri-ethylene glycol monobutyl ether, and 1,2-hexanediol; sodium laurylsulfate; sodium oleate; nonionic surfactants; etc. The penetration-accelerating agents provide sufficient effects when the amount thereof is 10 to 30% by mass of the ink. The amount is preferably selected such that blurs of the printed image and print-through are not caused.

Examples of the ultraviolet absorbers used for improving the storage stability of the image in the invention include benzotriazole compounds described in JP-A-58-185677, JP-A-61-190537, JP-A-2-782, JP-A-5-197075, JP-A-9-34057, etc.; benzophenone compounds described in JP-A-46-2784, JP-A-5-194483, U.S. Pat. No. 3,214,463, etc.; cinnamic acid compounds described in JP-B-48-30492, JP-B-56-21141, JP-A-10-88106, etc.; triazine compounds described in JP-A-4-298503, JP-A-8-53427, JP-A-8-239368, JP-A-10-182621, JP-T-8-501291 (the term "JP-T" as used herein means a published Japanese translation of a PCT patent application), etc.; and so-called fluorescent whitening agents, which absorb ultraviolet rays to emit fluorescence, represented by compounds described in Research Disclosure, No. 24239, stilbene compounds and benzoxazole compounds.

The antioxidants, which are used for improving the storage stability of the image in the invention, may be selected from various organic anti-fading agents and metal complex anti-fading agents. Examples of such organic anti-fading agents include hydroquinone compounds, alkoxyphenol compounds, dialkoxyphenol compounds, phenol compounds, aniline compounds, amine compounds, indan compounds, chroman compounds, alkoxyaniline compounds, heterocyclic compounds, etc., and examples of the metal complex anti-fading agents include nickel complexes and zinc complexes. More specific examples thereof include compounds described in patents cited in Research Disclosure, No. 17643, Items VII–I to J, ibid., No. 15162, ibid., No. 18716, page 650, left column, ibid., No. 36544, page 527, ibid., No. 307105, page 872, and ibid., No. 15162; and compounds of general formulas and compound examples described in JP-A-62-215272, pages 127 to 137.

Examples of the antimolds used in the invention include sodium dehydroacetate, sodium benzoate, sodium pyridinethione-1-oxide, ethyl p-hydroxybenzoate, 1,2-benzoisothiazoline-3-one and salts thereof, etc. The amount of the antimolds is preferably 0.02 to 5.00% by mass of the ink.

Details of the antimolds are described in Bokinbobaizai Jiten, Editing Committee of Dictionary (Jiten Hensyu Iinkai), The Society for Antibacterial and Antifungal Agents, Japan, etc.

Examples of the corrosion inhibitors include acidic sulfites, sodium thiosulfate, ammonium thioglycolate, diisopropylammonium nitrite, pentaerythritol tetranitrate, dicyclohexylammonium nitrite, benzotriazole, etc. The corrosion inhibitors are preferably used in an amount of 0.02 to 5.00% by mass of the ink.

The pH-adjusting agents are preferably used in the invention for adjusting pH value, for improving the dispersion stability, etc. The pH value of the ink is preferably adjusted to 8 to 11 at 25° C. When the pH value is less than 8, the solubility of the dye is often reduced to obstruct the nozzle. When the pH value is more than 11, the water resistance of the ink tends to be reduced. The pH-adjusting agent may be a basic compound such as an organic base and an inorganic alkaline compound, or an acidic compound such as an organic acid and an inorganic acid.

Examples of such basic compounds include inorganic compounds such as sodium hydroxide, potassium hydroxide, sodium carbonate, potassium carbonate, sodium hydrogen carbonate, potassium hydrogen carbonate, sodium acetate, potassium acetate, sodium phosphate and sodium hydrogenphosphate; aqueous ammonia; and organic bases such as methylamine, ethylamine, diethylamine, triethylamine, ethanolamine, diethanolamine, triethanolamine, ethylenediamine, piperidine, diazabicyclooctane, diazabicycloundecene, pyridine, quinoline, picoline, lutidine and collidine.

Examples of such acidic compounds include inorganic compounds such as hydrochloric acid, sulfuric acid, phosphoric acid, boric acid, sodium hydrogen sulfate, potassium hydrogen sulfate, potassium dihydrogen phosphate and sodium dihydrogen phosphate; and organic compounds such as acetic acid, tartaric acid, benzoic acid, trifluoroacetic acid, methanesulfonic acid, ethanesulfonic acid, benzenesulfonic acid, p-toluenesulfonic acid, saccharic acid, phthalic acid, picolinic acid and quinolinic acid.

The conductivity of the black ink of the invention is 0.01 to 10 S/m, preferably 0.05 to 5 S/m.

The conductivity may be measured by an electrode method using a commercially-available, saturated potassium chloride.

The conductivity can be controlled mainly by the ion concentration of the aqueous solution. When the salt level is high, the aqueous solution may be desalted by using an ultrafilter membrane, etc. Further, in the case of controlling the conductivity by adding a salt, etc., the salt may be selected from various organic salts and inorganic salts.

Examples of such inorganic salts include potassium halides, sodium halides, sodium sulfate, potassium sulfate, sodium hydrogen sulfate, potassium hydrogen sulfate, sodium nitrate, potassium nitrate, sodium hydrogen carbonate, potassium hydrogen carbonate, sodium phosphate, sodium hydrogen phosphate, borate salts, potassium dihydrogen phosphate, sodium dihydrogen phosphate, etc. Examples of such organic salts include sodium acetate, potassium acetate, potassium tartrate, sodium tartrate, sodium benzoate, potassium benzoate, sodium p-toluenesulfonate, potassium saccharate, potassium phthalate, sodium picolinate, etc.

Further, the conductivity may be controlled by properly selecting the components of the aqueous medium to be hereinafter described.

The viscosity of the black ink of the invention at 25° C. is preferably 1 to 20 mPa·s, more preferably 2 to 15 mPa·s, particularly preferably 2 to 10 mPa·s. When the viscosity is more than 20 mPa·s, the fixing rate of the recorded image and the discharging property of the ink are reduced. When the viscosity is less than 1 mPa·s, the printed image blurs to be low in quality.

The viscosity can be controlled by selecting the amount of the ink solvent. Examples of the ink solvents include glycerin, diethyleneglycol, triethanolamine, 2-pyrrolidone, diethyleneglycol monobutyl ether, triethyleneglycol monobutyl ether, etc.

The viscosity-controlling agent may be used in the invention. Examples of the viscosity-controlling agents include water-soluble polymers such as celluloses and polyvinyl alcohol, and nonionic surfactants. The viscosity-controlling agents are described in more detail in *Nendo Tyosei Gijutsu*, Gijutsu Joho Kyokai, 1999, Chapter 9, and *Inkujetto Purinta Yo Kemikaruzu, -Zairyo No Kaihatsu Doko Tenbo Tyosa-*, 98 enlarged edition, CMC Publishing Co., Ltd., 1997, pages 162 to 174.

Methods for measuring a liquid viscosity are described in detail in JIS Z8803. The viscosity can be easily measured by a commercially-available viscometer. For example, B-type viscometer and E-type viscometer available from Tokyo Keiki Co,. Ltd. are known as rotational viscometers. In the invention, the viscosity of the black ink was generally measured at 25° C. by oscillatory type viscometer VM-100A-L available from Yamaichi Electronics Co., Ltd. The unit for viscosity is the pascal-second (Pa·s), and the milipascal-second (mPa·s) is usually used.

The dynamic surface tension and the static surface tension of the black ink of the invention are preferably 20 to 50 mN/m, more preferably 20 to 40 mN/m, at 25° C. When the surface tensions are more than 50 mN/m, the discharge stability is reduced, and the printed character is blurred in a color mixture or forms a linear stain, whereby the printing quality is remarkably deteriorated. On the other hand, in the case where the surface tensions are less than 20 mN/m, the ink is often attached to a hardware surface when discharged, whereby the printing is often deteriorated.

To control the surface tensions, the above-mentioned, cationic, anionic, nonionic, or betaine-based surfactants may be added to the black ink. A plurality of surfactants may be used in combination.

Known as methods for measuring the static surface tension are capillary rise methods, dropping methods, flying ring methods, etc. In the invention, the static surface tension is usually measured by a vertical plate method.

When a thin plate of a glass or platinum is partly soaked in a liquid and hanged vertically, the surface tension of the liquid acts downward in the length of the plate touched with the liquid. The surface tension is balanced with an upward force to be measured.

Known as methods for measuring the dynamic surface tension are oscillatory jet methods, meniscus depletion methods, maximum bubble pressure methods, etc. described in *Shin Jikken Kagaku Koza*, 18, *Kaimen To Koroido*, pages 69 to 90, Maruzen Co., Ltd. (1977), etc.; and liquid film disruption methods described in JP-A-3-2064. In the invention, the dynamic surface tension is usually measured by a differential bubble pressure method. The principle and procedures of the differential bubble pressure method is described below.

When bubbles are generated in a stirred uniform solution, new gas-liquid interfaces are formed and surfactant molecules in the solution gather on the surfaces of the liquid at a uniform rate. When the bubble rate (rate of generating the bubbles) is reduced, more surfactant molecules gather on the surfaces of the bubbles, whereby the maximum bubble pressure immediately before the break of the bubbles is lowered. Thus, the maximum bubble pressure (the surface tension) related to the bubble rate is detected. The dynamic surface tension is preferably measured by a method, in which bubbles are generated in a solution by using two large and small probes, and the pressure difference between the two probes is measured at the maximum bubble pressure state to calculate the dynamic surface tension.

Mass ratio of non-volatile components to the total mass of the black ink is preferably 10 to 70% by mass from the viewpoints of the discharge stability of the ink, the printing quality, various fastnesses of a printed image, reduction of blurs in a printed image, and reduction of tackiness of a printed surface. The mass ratio is more preferably 20 to 60% by mass from the viewpoints of the discharge stability of the ink, and reduction of blurs in a printed image.

The term "non-volatile component" means a component having a boiling point of 150° C. or higher at 1 atm, which may be a liquid component, a solid component, or a high molecular weight component. Examples of such non-volatile components in the ink for ink-jet recording may include dyes, high boiling solvents, polymer latexes added if necessary, surfactants, dye-stabilizing agents, antimolds, buffers, etc. Many of the non-volatile components other than the dye-stabilizing agents reduce the dispersion stability of the ink, and exist on an ink-jet image-receiving paper even after printing to inhibit stabilization by association of the dyes on the image-receiving paper. Thus, such non-volatile components deteriorate various fastnesses of the image and increase blurs in the image under a high humidity condition.

The black ink of the invention may contain a high molecular weight compound. The term "high molecular weight compound" means a compound having a number average molecular weight of 5,000 or more. Examples of such high molecular weight compounds include water-soluble polymer compounds that can be substantially dissolved in the aqueous medium; water-dispersible polymer compounds such as polymer latexes and polymer emulsions; and alcohol-soluble polymer compounds that can be dissolved in a polyhydric alcohol used as a cosolvent. The high molecular weight compounds include such polymer compounds that can be substantially dissolved or dispersed in the ink liquid uniformly.

Specific examples of the water-soluble polymer compounds include water-soluble polymers such as polyvinyl alcohol, silanol-modified polyvinyl alcohol, carboxymethylcellulose, hydroxyethylcellulose, polyvinylpyrrolidone, polyalkylene oxides (e.g. polyethylene oxide, polypropylene oxide, etc.), and polyalkylene oxide derivatives; natural water-soluble polymers such as polysaccharides, starches, cationized starches, casein and gelatin; aqueous acrylic resins such as polyacrylic acid, poly acrylamide and copolymers thereof; aqueous alkyd resins; and water-soluble polymers having a —SO$_3^-$ or —COO$^-$ group, substantially soluble in the aqueous medium.

Examples of the polymer latexes include styrene-butadiene latexes, styrene-acrylic latexes, polyurethane latexes, etc. Further, examples of the polymer emulsions include acrylic emulsions.

The water-soluble polymer compounds may be used singly or in combination with each other.

The water-soluble polymer compounds may be used as a viscosity-controlling agent as described above, for controlling the viscosity of the ink to obtain an excellent discharge property. When the amount thereof is excess, the viscosity of the ink is increased, whereby the discharge stability of the ink liquid is reduced and the nozzle is liable to be obstructed with precipitates in the ink produced with the passage of time.

The amount of the viscosity-controlling agent of the polymer compound depends on the molecular weight thereof (the higher the molecular weight, the smaller the amount may be). The mass ratio of the viscosity-controlling agent to the entire ink is generally 0 to 5% by mass, preferably 0 to 3% by mass, more preferably 0 to 1% by mass.

In the invention, if necessary, the above-mentioned cationic, anionic, nonionic, or betaine-based surfactants may be used as the dispersing agent or the dispersion stabilizer, and fluorine compounds, silicone compounds and chelating agents represented by EDTA may be used as the antifoaming agent.

Reflection-type medias used for forming an image by the black ink of the invention are described below. Examples of the reflection-type medias include recording papers, recording films, etc. Supports used in the recording papers and the recording films may be made of a chemical pulp such as LBKP and NBKP; a mechanical pulp such as GP, PGW, RMP, TMP, CTMP, CMP and CGP; waste paper pulp such as DIP; etc. The pulps may be mixed with a known additive such as a pigment, a binder, a sizing agent, a fixing agent, a cationic agent and a paper-reinforcing agent if necessary, and the support may be prepared by a Fourdrinier machine, a cylinder machine, etc. Also, the support may be a synthetic paper sheet or a plastic film sheet. The thickness of the support is preferably 10 to 250 μm, and the basis weight thereof is preferably 10 to 250 g/m$^2$.

The image-receiving material for the black ink of the invention may be prepared by forming an image-receiving layer and a back coat layer directly on the support. Alternatively, after a size press or an anchor coat layer of a starch, polyvinyl alcohol, etc. is formed on the support, an image-receiving layer and a back coat layer may be formed thereon to prepare the image-receiving material. Further, the support may be subjected to a flattening treatment using a calendering apparatus such as a machine calender, a TG calender and a soft calender.

In the invention, more preferably used as the support are paper sheets laminated with a polyolefin (e.g., polyethylene, polystyrene, polybutene, a copolymer thereof) or polyethylene terephthalate on both sides, and plastic films. It is preferred that a white pigment (e.g., titanium oxide, zinc oxide) or a coloring dye (e.g., cobalt blue, ultramarine blue, neodymium oxide) is added to the polyolefin.

A porous material or an aqueous binder is contained in the image-receiving layer disposed on the support. Further, the image-receiving layer preferably contains a pigment. The pigment is preferably a white pigment, and examples of such white pigments include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate; and organic pigments such as styrene pigments, acrylic pigments, urea resins and melamine resins. Porous, inorganic white pigments are particularly preferred, and a synthetic amorphous silica having a large pore area is particularly suitable, as the white pigment. The synthetic amorphous silica may be a silicic anhydride obtained by a dry process (gas phase method) or a hydrous silicic acid obtained by a wet process.

The recording paper with the image-receiving layer containing the pigment may be such as disclosed in JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777, JP-A-2001-301314, etc.

Examples of the aqueous binders contained in the image-receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinyl pyrrolidone, a polyalkylene oxide and polyalkylene oxide derivatives; and water-dispersible polymers such as styrene-butadiene latexes and acrylic emulsions; etc. These aqueous binders may be used alone or as a combination of a plurality thereof. Among the aqueous binders, polyvinyl alcohol and silanol-modified polyvinyl alcohol are particularly suitable from the viewpoints of adhesion to the pigment and the separation resistance of the image-receiving layer.

The image-receiving layer may contain an additive such as a mordant, a water resistance-imparting agent, a light resistance-improving agent, a gas resistance-improving agent, a surfactant and a hardening agent, in addition to the pigment and the aqueous binder.

It is preferred that the mordant to be added to the image-receiving layer is immobilized. For this purpose, polymer mordants are preferably used.

The polymer mordants are described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, and U.S. Pat. Nos. 2,484,430, 2,548,564, 3,148,061, 3,309,690, 4,115,124, 4,124,386, 4,193,800, 4,273,853, 4,282,305 and 4,450,224. The image-receiving material particularly preferably contains a polymer mordant described in JP-A-1-161236, pages 212 to 215. In the case of using this polymer mordant, an image is formed with excellent quality and improved with respect to light resistance.

The water resistance-imparting agent is effective for proving a water-resistant image. Cationic resins are particularly preferably used as the water resistance-imparting agent. Examples of such cationic resins include polyamide polyamine epichlorohydrin, polyethyleneimine, polyamine sulfone, dimethyldiallylammonium chloride polymer, cationic polyacrylamide, etc. The mass ratio of the cationic resin to the total solid content of the image-receiving layer is preferably 1 to 15% by mass, and particularly preferably 3 to 10% by mass.

Examples of the light resistance-improving agent and the gas resistance-improving agent include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl-containing compounds, ester compounds, amide compounds, ether compounds, alcohol compounds, sulfinic acid compounds, saccharides, water-soluble reducing compounds, organic acids, inorganic acids, hydroxy-containing organic acids, benzotriazole compounds, benzophenone compounds, triazine compounds, heterocyclic compounds, water-soluble metal salts, organic metal compounds, metal complexes, etc.

Specific examples thereof include compounds described in JP-A-10-182621, JP-A-2001-260519, JP-A-2000-260519, JP-B-4-34953, JP-B-4-34513, JP-B-4-34512, JP-A-11-170686, JP-A-60-67190, JP-A-7-276808, JP-A-2000-94829, JP-T-8-512258, JP-A-11-321090, etc.

The surfactant acts as a coating aid, a separation improver, a slipperiness improver or an antistatic agent. The surfactant is described in JP-A-62-173463 and JP-A-62-183457.

An organic fluoro compound may be used instead of the surfactant. The organic fluoro compound is preferably hydrophobic. Examples of the organic fluoro compounds include fluorine surfactants, oily fluorine compounds (e.g., a fluorine oil) and solid fluorine compound resins (e.g., a tetrafluoroethylene resin). The organic fluoro compound is described in JP-B-57-9053 (columns 8 to 17), JP-A-61-20994 and JP-A-62-135826.

Usable as the hardening agent are materials described in JP-A-1-161236, page 222, JP-A-9-263036, JP-A-10-119423, JP-A-2001-310547, etc.

Other additives added to the image-receiving layer include pigment-dispersing agents, thickening agents, antifoaming agents, dyes, fluorescent whitening agents, antiseptic agents, pH-adjusting agents, matting agents, hardening agents, etc. The image-receiving layer may be composed of one or two layer.

A back coat layer may be formed in the recording paper or the recording film. A white pigment, an aqueous binder, etc. may be added to the back coat layer.

Examples of such white pigments contained in the back coat layer include white inorganic pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo boehmite, aluminum hydroxide, alumina, lithopone, zeolite, hydrous halloysite, magnesium carbonate and magnesium hydroxide; and organic pigments such as styrene plastic pigments, acrylic plastic pigments, polyethylene, microcapsules, urea resins and melamine resins.

Examples of such aqueous binders contained in the back coat layer include water-soluble polymers such as styrene/maleate copolymers, styrene/acrylate copolymers, polyvinyl alcohol, silanol-modified polyvinyl alcohol, starch, cationized starch, casein, gelatin, carboxymethyl cellulose, hydroxyethyl cellulose and polyvinyl pyrrolidone; and water-dispersible polymers such as styrene-butadiene latexes and acrylic emulsions.

Examples of other components contained in the back coat layer include antifoaming agents, foam inhibitors, dyes, fluorescent whitening agents, antiseptic agents, water resistance-imparting agents, etc.

Dispersion of fine polymer particles may be added to the layers (including the back coat layer) of the ink-jet recording paper and the recording film. The dispersion of fine polymer particles are used for improving film properties such as dimensional stability, curl prevention, adhesion prevention and crack prevention. The dispersion of fine polymer particles is described in JP-A-62-245258, JP-A-62-136648 and JP-A-62-110066. By adding the dispersion of fine polymer particles with a low glass transition temperature of 40° C. or lower to a mordant-containing layer, cracks and curls of the layer can be prevented. The curls can be prevented also by adding the dispersion of fine polymer particles with a high glass transition temperature to a back layer.

There are no restrictions in the ink-jet recording system using the black ink of the invention. The ink-jet recording system may be known one such as a charge control system where the ink is discharged by utilizing an electrostatic attracting force; a drop-on-demand system (pressure pulse system) utilizing a vibration pressure of a piezo device; an acoustic ink-jet system where electric signals are converted to acoustic beams, the acoustic beams are irradiated on an ink, and whereby the radiation pressure is utilized for discharging the ink; and a thermal ink-jet system (bubble jet system) where an ink is heated to form bubbles and thus-provided pressure is utilized.

Further examples of the ink-jet recording systems include systems of injecting an ink with a low concentration called a photo ink as a number of droplets small in volume; systems of using a plurality of inks with substantially same hue and different density to improve image quality; and systems using a colorless, transparent ink.

The black ink of the invention can be used for various purposes other than the ink-jet recording. For example, the black ink may be used as an image-forming material for image-displaying materials, interior decoration materials, exterior decoration materials, etc.

Examples of the image-displaying materials include posters, wall papers, small decoration articles (ornaments, dolls, etc.), advertising circulars, packing papers, wrapping materials, paper bags, plastic bags, package materials, signboards, images drawn or attached onto side surfaces of transport facilities (automobiles, buses, electric railcars, etc.), clothes with logos, etc. In the case of using the black ink of the invention as an image-forming material for such image-displaying materials, the term "image" includes all patterns perceivable by human beings such as abstract designs, characters and geometrical patterns, in addition to narrow definition of image.

Examples of the interior decoration materials include wall papers, small decoration articles (ornaments, dolls, etc.), members of lighting equipments, designed members of floors or ceilings, etc. In the case of using the black ink of the invention as an image-forming material, the term "image" includes all patterns perceivable by human beings such as abstract designs, characters and geometrical patterns, in addition to narrow definition of image.

Examples of the exterior decoration materials include wall papers, roofing materials, signboards, gardening materials, small exterior decoration articles (ornaments, dolls, etc.), members of exterior lighting equipments, etc. In the case of using the black ink of the invention as an image-forming material, the term "image" includes all patterns perceivable by human beings such as abstract designs, characters and geometrical patterns, in addition to narrow definition of image.

Examples of medias, on which a pattern is formed for the above uses, include papers, fibers, cloths such as nonwoven fabrics, plastics, metals, ceramics, etc. Dyeing may be achieved by mordanting, textile printing, or fixing a reactive dye with a reactive group. Among them, the mordanting is preferred.

In production of the ink, ultrasonic vibration treatment may be carried out, for example, in a process of dissolving a component such as the dye.

In the ultrasonic vibration treatment, to prevent the ink from generating bubbles by a pressure in a print head, an ultrasonic wave energy equal to or more than an energy provided by the print head is applied to a liquid in a process for producing the ink beforehand to remove the bubbles.

Frequency of ultrasonic wave used in the ultrasonic vibration treatment is generally 20 kHz or more, preferably 40 kHz or more, more preferably 50 kHz or more. The energy applied to the liquid in the ultrasonic vibration treatment is generally $2\times10^7$ J/m$^3$ or more, preferably $5\times10^7$ J/m$^3$ or more, more preferably $1\times10^8$ J/m$^3$ or more. The time of applying the ultrasonic vibration is generally 10 minutes to 1 hour.

The ultrasonic vibration treatment is effective, as long as it is carried out after the dye is added to a solvent. Also, the ultrasonic vibration treatment is effective even in the case where it is carried out after the produced ink is once stored. It is preferred that the ultrasonic vibration is applied to the liquid in the process of dissolving and/or dispersing the dye in the solvent. In this case, the bubbles are more effectively removed and the dissolution and/or dispersion of the dye is promoted by the ultrasonic vibration.

Thus, the ultrasonic vibration treatment may be carried out, in the process of dissolving and/or dispersing the dye in the solvent, and/or in a process after the dissolution and/or dispersion. In other words, the ultrasonic vibration treatment may be carried out one or more times before the ink production is completed.

The process of dissolving and/or dispersing the dye in the solvent preferably comprises the steps of dissolving the dye in a part of the solvent, and mixing the residual solvent with the resultant solution. The ultrasonic vibration treatment is carried out, preferably in at least one of the steps, more preferably in at least the step of dissolving the dye in a part of the solvent.

The residual solvent may be mixed with the resultant solution at one pot or stepwise. In the production of the ink of the invention, heat deairing or evacuation is preferably carried out to more effectively remove the bubbles in the ink. The heat deairing or evacuation is preferably carried out in or after the step of mixing the residual solvent.

In the ultrasonic vibration treatment, the ultrasonic vibration may be provided by a known apparatus such as an ultrasonic dispersion apparatus.

In the production of the black ink of the invention, it is important that solid contents are removed by filtration after the liquid preparation. A filter is used in the filtration, and effective diameter thereof is 1 μm or less, preferably 0.05 to 0.3 μm, particularly preferably 0.25 to 0.3 μm. The filter may be made of various materials, and in the case of the ink using the water-soluble dye, a filter for an aqueous solution is preferably used. Particularly preferred is a filter made of a polymer material, which hardly provide dusts. The filtration may be carried out by a pumping method, a pressure filtration method, a vacuum filtration method, etc.

After the filtration, air is often taken in the solution. Because bubbles due to the air often cause the imperfection of the image, the defoaming treatment is preferably carried out by various methods such as a method of leaving the solution, an ultrasonic defoaming method or a vacuum defoaming method using a commercially-available apparatus, etc. In the ultrasonic defoaming method, the solution is subjected to the defoaming treatment preferably for 30 seconds to 2 hours, more preferably for 5 minutes to 1 hour.

These treatments are preferably carried out in a clean room, clean bench, etc., to prevent dusts from being mixed with the solution. In the invention, the treatments are particularly preferably carried out in a space with a cleanness of class 1,000 or less. The term "cleanness" means a value measured by a dust counter.

The droplets of the ink discharged onto the recording material usually have a volume of 0.1 to 100 pl. The volume is preferably 0.5 to 50 pl, particularly preferably 2 to 50 pl.

There are no restrictions in the ink-jet recording system using the black ink of the invention. The ink-jet recording system may be known one such as a charge control system where the ink is discharged by utilizing an electrostatic attracting force; a drop-on-demand system (pressure pulse system) utilizing a vibration pressure of a piezo device; an acoustic ink-jet system where electric signals are converted to acoustic beams, the acoustic beams are irradiated on an ink, and whereby the radiation pressure is utilized for discharging the ink; and a thermal ink-jet system (bubble jet system) where an ink is heated to form bubbles and thus-provided pressure is utilized.

Further examples of the ink-jet recording systems include systems of injecting an ink with a low concentration called a photo ink as a number of droplets small in volume; systems using a plurality of inks with substantially same hue and different density to improve image quality; and systems using a colorless, transparent ink. The volume of the ink droplet is controlled mainly in the print head.

For example, in the thermal ink-jet system, the volume of the ink droplet can be controlled by changing the structure of the print head. Thus, the droplets with desired size can be provided by changing a size of an ink room, a heating head, a nozzle, etc. Further, in the thermal ink-jet system, a plurality of droplets having a different size can be discharged by using a plurality of print heads with different size of a nozzle.

In the case of the drop-on-demand system using a piezo device, the volume of the ink droplet can be controlled by changing the structure of the print head as well as the thermal ink-jet system. Further, in this case, a plurality of droplets each having a different size can be discharged from print heads with the same structure by controlling waveforms of signals for driving the piezo device as described below.

In the invention, frequency of discharging the ink onto the recording material is 1 kHz or more.

In the case of recording a high-quality image like a photography, the discharging density is preferably 600 dpi (dot per inch) or more to reproduce the image with high sharpness by small ink droplets.

When the ink is discharged from a plurality of print heads having nozzles, the number of the print heads that can be simultaneously driven is approximately several tens to 200 in the case of using a printer where the print heads move perpendicularly to the recording paper. In the case of using fixed print heads called line head, the number is several hundreds. A large number of print heads cannot be simultaneously driven because driving electric power is limited and heat in the print heads affects the image quality.

Recording rate can be increased by increasing the driving frequency.

In the thermal ink-jet system, the discharging frequency can be controlled by selecting a frequency of head-driving signals for heating the print heads.

In the piezo system, the discharging frequency can be controlled by selecting a frequency of signals for driving the piezo device.

The drive of the piezo heads is described below. Signals of an image to be printed are converted into signals for driving the print heads, such that size, rate and frequency of discharging are determined in a control part of a printer. The driving signals are supplied to the print heads. The size, rate and frequency of discharging are controlled by the signals for driving the piezos. The size and rate of discharging are determined depending on the waveform and amplitude of the driving signals, and the frequency is determined depending on cycle period of the signals.

When the discharging frequency is 10 kHz, the print heads are driven every 100 μs and recording of 1 line is completed for 400 μs. By controlling a drift speed of the recording paper to 1/600 inch (approximately 42 μm) per 400 μs, the image can be printed at a rate of 1 sheet per 1.2 second.

Constitutions of a printer disclosed in JP-A-11-170527 are preferred for the black ink of the invention. Ink cartridge disclosed in JP-A-5-229133 is preferably used for the black ink. Absorption and constitutions of a cap that covers a print head in the absorption, etc. disclosed in JP-A-7-276671 are preferred for the black ink. Further, such a filter for removing bubbles as disclosed in JP-A-9-277552 is preferably disposed near the head.

The surface of the nozzle is preferably subjected to such a water repellent treatment as described in Japanese Patent Application No. 2001-016738. The black ink may be used for a printer to be connected to a computer, or a printer specializing in print of a photograph.

The average rate of discharging the black ink for ink-jet recording, which is prepared by dissolving and/or dispersing at least one black dye of the invention to the aqueous medium, onto the recording material is preferably 2 m/sec or more, more preferably 5 m/sec.

The discharging rate may be controlled by selecting the waveform and amplitude of the signals for driving the heads.

A plurality of droplets with a different size can be discharged from one print head by properly using a plurality of driving waveform.

EXAMPLES

The present invention will be described below with reference to Examples without intention of restricting the scope of the present invention.

Examples

After the total volume of the components mentioned below was adjusted to 1 liter by adding water, the resultant mixture was stirred at 30 to 40° C. for 1 hour while heating. Then, the mixture was filtrated under reduced pressure by a microfilter having the average pore diameter of 0.25 μm to prepare a black ink Bk-101. The content of heavy metal ions in the black ink Bk-101 was measured by an atomic absorption method. As a result, 0.29 mmol/l of iron ions and trace amounts of other transition metal ions were detected, and the total content of the transition metal ions was 0.37 mmol/l.

| [Composition of Black ink Bk-101] | |
|---|---|
| (Solid components) | |
| Black dye of the invention (BL-1) | 75 g/l |
| (L: long wavelength type, λmax: 589 nm, $W_{1, 1/2}$: 125 nm) | |
| Black dye of the invention CBS-1) | 30 g/l |
| CS: short wavelength type, Xmax: 462 nm) | |
| Proxel | 5 g/l |
| Urea | 10 g/l |
| Benzotriazole | 3 g/l |
| (Liquid components) | |
| Diethyleneglycol monobutyl ether (DGB) | 120 g/l |
| Glycerin (GR) | 125 g/l |
| Diethyleneglycol (DEG) | 100 g/l |
| 2-Pyrrolidone | 35 g/l |
| Lithium hydroxide | 8 g/l |
| SURFYNOL STG (SW) | 10 g/l |

The oxidation potentials (Eox) of the black dyes BL-1 and BS-1 were obtained by the above-described measuring method, and as a result, it was confirmed that the oxidation potentials were more than 1.0 V (vs SCE).

Black inks Bk-102 to Bk-110 were prepared in the same manner as the black ink Bk-101 except for using the black dyes and water shown in Table 7, respectively. The components other than the black dyes and water in the black inks Bk-102 to Bk-110 were the same as those in the black ink Bk-101.

Incidentally, used as comparative dyes were the following three dyes:

1) long wavelength type black dye (A) having an oxidation potential (Eox) of 1.0 V (vs SCE) or less;
2) long wavelength type black dye (B) exhibiting a half value width $W_{\lambda, 1/2}$ of less than 100 nm in an absorption spectrum in a dilute solution normalized to an absorbance of 1.0; and
3) short wavelength type black dye (C) having an oxidation potential (Eox) of 1.0 V (vs SCE) or less.

The long wavelength type black dye (B) also had an oxidation potential of 1.0 V (vs SCE) or less.

The structure or Color Index of each black dye is shown below.

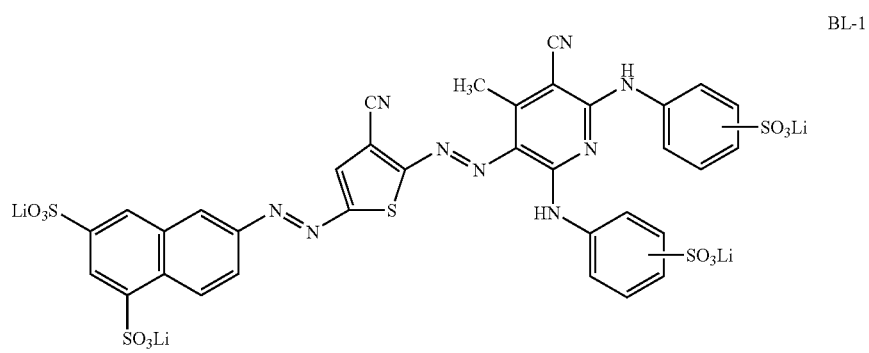

BL-1

-continued

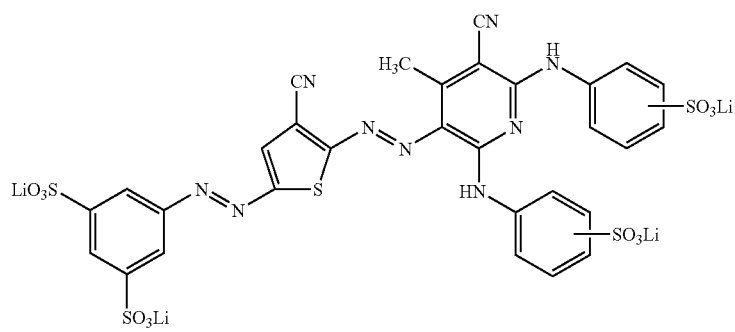

BL-2

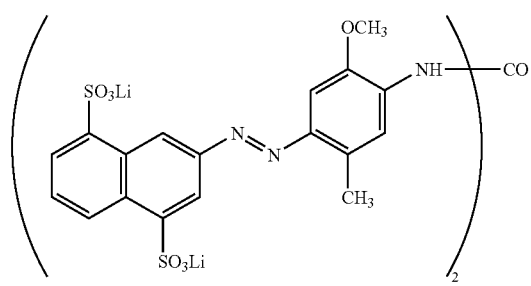

BS-1

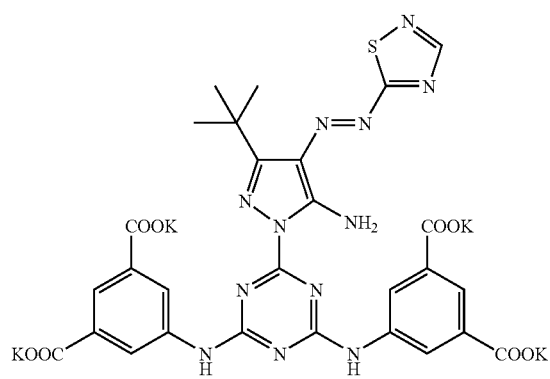

BS-2

C. I. FOOD BLACK 2

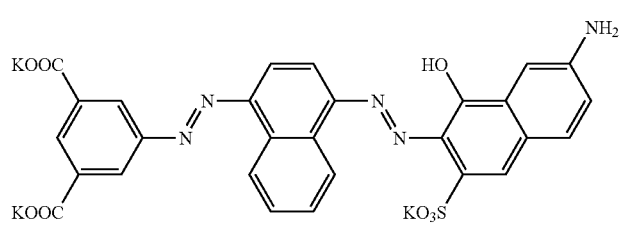

C. I. DIRECT YELLOW 120

A

B

C

The oxidation potentials (Eox) of the black dyes BL-2 and BS-2 were obtained by the above-described measuring method, and as a result, it was confirmed that the oxidation potentials were more than 1.0 V (vs SCE). Further, the black dye BL-2 had λmax of 590 nm and $W_{\lambda, 1/2}$ of 122 nm, and the black dye BS-2 had λmax of 457 nm.

The black inks shown in Table 7 were prepared by using these black dyes. The black inks Bk-102 to Bk-110 were prepared in the same manner as the black ink Bk-101 except that water was changed, that the black dyes were changed, and/or that the black dyes were desalted and purified, respectively.

TABLE 7

| No. | Black Dye | Water | Heavy Metal Ion Content |
|---|---|---|---|
| PM-950C (Bk) (Comparative Example) | — | — | — |
| Bk-101 (Comparative Example) | BL-1, BS-1 (unpurified) | Unpurified Water | 0.37 mmol/l |
| Bk-102 (Comparative Example) | A, C (unpurified) | Unpurified Water | 0.39 mmol/l |
| Bk-103 (Comparative Example) | B, C (unpurified) | Unpurified Water | 0.43 mmol/l |
| Bk-104 (Comparative Example) | B, BS-1 (unpurified) | Unpurified Water | 0.86 mmol/l |
| Bk-105 (Comparative Example) | BL-1, BS-1 (purified) | Unpurified Water | 0.22 mmol/l |
| Bk-106 (Present Invention) | BL-1, BS-1 (purified) | Ion-exchange Water | 0.002 mmol/l |
| Bk-107 (Present Invention) | BL-1, BS-1 (purified) | Ion-exchange Water | 0.003 mmol/l |
| Bk-108 (Present Invention) | BL-1, BS-1 (purified) | Ultrapure Water | 0.0001 mmol/l |
| Bk-109 (Present Invention) | BL-2, BS-1 (purified) | Ultrapure Water | 0.0001 mmol/l |
| Bk-110 (Present Invention) | BL-1, BS-2 (purified) | Ultrapure Water | 0.0001 mmol/l |

The ultrapure water was available from Wako Pure Chemical Industries, Ltd.

Further, a black ink for PM-950C available from Seiko Epson Corporation was used as a comparative ink.

Each of the above black inks was charged in a black ink cartridge of the ink-jet printer PM-950C manufactured by Seiko Epson Corporation, and inks of PM-950C for other colors were used, whereby an image comprising a gray image pattern and a character pattern was printed. The image contained a black square symbol of JIS code 2223 printed in 48-point. In addition, a test image chart of ISO/JIS 12640 was used to visually evaluate the color tone of the image. The image was printed on an image-receiving sheet of an ink-jet paper, gloss photo paper "KASSAI" available from Fuji Photo Film Co., Ltd. The image quality, the discharging property of the ink, and the image fastness were evaluated.

(Evaluation Experiments)

1) The cartridge was set in the printer, it was confirmed that the ink was discharged from all the nozzles, and then, the printer was stopped. The printer was left to stand under conditions of 15° C. and 30% RH for 72 hours, and the image was then outputted on 100 sheets of A4 papers. The discharging property of the black ink was evaluated in conformity with the following standards.

A: imperfection of the printed image was not observed from the beginning to the completion of the printing.

B: imperfection of the printed image was often observed.

C: imperfection of the printed image was observed from the beginning to the completion of the printing.

2) The storage stability of the printed image of the black ink was evaluated by using a printing sample as follows. The black square symbol of JIS code 2223 printed in 48-point (hereinafter referred to as "pattern S") was measured by X-rite 310TR density-measuring apparatus comprising a status A filter, to evaluate the image storage stability (all samples were measured).

(i) The density ($D_{vis}$) Ci of the pattern S was measured immediately after the printing, and the image was irradiated with a xenon light (85,000 lux) by a weather meter manufactured by Atlas Co. for 14 days. Then, the density Cf of the pattern S was measured, and the dye-remaining rate (100×Cf/Ci) was determined to evaluate the light fastness.

When the dye-remaining rate was 80% or more, the light fastness was evaluated as A. When the dye-remaining rate was 70% or more and less than 80%, the light fastness was evaluated as B. When the dye-remaining rate was less than 70%, the light fastness was evaluated as C.

(ii) The densities of the pattern S were measured by X-rite 310TR before and after storing the pattern S under conditions of 80° C. and 70% RH for 10 days to determine the dye-remaining rate, thereby evaluating the heat fastness.

When the dye-remaining rate was 90% or more, the heat fastness was evaluated as A. When the dye-remaining rate was 80% or more and less than 90%, the heat fastness was evaluated as B. When the dye-remaining rate was less than 80%, the heat fastness was evaluated as C.

(iii) The densities of the pattern S were measured by X-rite 310TR before and after leaving the pattern S in a box under a condition of the ozone gas concentration of 5 ppm for 72 hours to determine the dye-remaining rate, thereby evaluating the ozone fastness ($O_3$ fastness).

The ozone gas concentration in the box was controlled by an ozone gas monitor (model: OZG-EM-01) manufactured by APPLICS.

When the dye-remaining rate was 80% or more, the $O_3$ fastness was evaluated as A. When the dye-remaining rate was 70% or more and less than 80%, the $O_3$ fastness was evaluated as B. When the dye-remaining rate was less than 70%, the $O_3$ fastness was evaluated as C.

3) A pattern, in which four black squares of 3 cm×3 cm were arranged in a square lattice shape in 2 columns and 2 rows with 1 mm-width separation of white background space, was printed. After this image sample was stored under conditions of 25° C. and 90% RH for 10 days, the blur of the black dye in the white background space was observed, and the increase in the density ($D_{vis}$) of the white background was measured based on the density measured immediately after the printing, to evaluate the blur property of the ink under high humidity.

When the increase was 0.01 or less, the blur property was evaluated as A. When the increase was 0.01 to 0.05, the blur property was evaluated as B. When the increase was 0.05 or more, the blur property was evaluated as C.

The results are shown in Table 8.

TABLE 8

| No. | Discharging Property | Light Fastness | Heat Fastness | $O_3$ Fastness | Blur Property |
|---|---|---|---|---|---|
| PM-950C (Bk) (Comparison) | A | B | B | C | C |
| Bk-101 (Comparison) | B | B | A | B | A |
| Bk-102 (Comparison) | B | C | B | C | C |
| Bk-103 (Comparison) | B | C | B | C | C |

TABLE 8-continued

| No. | Discharging Property | Light Fastness | Heat Fastness | O$_3$ Fastness | Blur Property |
|---|---|---|---|---|---|
| Bk-104 (Comparison) | B | C | A | C | C |
| Bk-105 (Comparison) | B | B | A | B | A |
| Bk-106 (Invention) | A | A | A | A | A |
| Bk-107 (Invention) | A | A | A | A | A |
| Bk-108 (Invention) | A | A | A | A | A |
| Bk-109 (Invention) | A | A | A | A | A |
| Bk-110 (Invention) | A | A | A | A | A |

As shown in Table 8, the black inks of the invention were superior to the comparative inks in the total of the properties.

Particularly, in each image provided by the black inks of the invention, the sharpness of the black image was not changed to be in excellent state.

In the black images provided by the inks using the long wavelength type black dye (B) (Bk-103 and Bk-104), the color valance was remarkably deteriorated after fading.

Further, the reflection densities $D_R$, $D_G$ and $D_B$ of the pattern S were measured with respect to 3 colors of C (cyan), M (magenta) and Y (yellow) by the X-rite 310TR density-measuring apparatus comprising the status A filter, and whereby the forced fading rate constants $k_R$, $k_G$ and $k_B$ of the pattern S were determined. As a result, the black inks of the invention had 1.05 or less of the ratio R, which is a ratio of the maximum value to the minimum value of the forced fading rate constants $k_R$, $k_G$ and $k_B$. As compared with this, the black inks Bk-102 to 5 had the ratio R of 1.25 or more, and thus, the color balance of the black image was remarkably deteriorated.

The effects of the invention were clear also from these results.

Further, the other black inks of the invention, which were prepared in the same manner as the above examples except for using the other black dyes represented by the general formula (1), had properties equal to those of the above examples.

Furthermore, the effects of the invention equal to the above examples were obtained also in the case of using PM photo paper manufactured by Seiko Epson Corporation or PR101 manufactured by Canon K. K. as the image-receiving paper.

In the present invention, a black ink for ink-jet recording, which is a water ink advantageous in handling, odor, safeness, etc. and excellent in durability of image (including durability of image quality) and discharging property, is provided.

The entire disclosure of each and every foreign patent application: Japanese Patent Applications No. 2002-286179, from which the benefit of foreign priority has been claimed in the present application is incorporated herein by reference, as if fully set forth.

What is claimed is:

1. A black ink for ink-jet recording, comprising a dye dissolved and/or dispersed in an aqueous medium, wherein the dye has a λmax of 500 to 700 nm and a half value width of 100 nm or more in an absorption spectrum of a dilute solution normalized to an absorbance of 1.0 and is a dye represented by the following general formula (1):

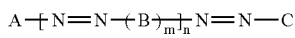

wherein A, B and C each independently represent an aromatic or heterocyclic group, which are substituted or unsubstituted provided that two or more of A, B and C is a substituted or unsubstituted, unsaturated heterocyclic group; m is 1 or 2; n is 1 or 2, wherein the black ink has: a transition metal ion content of 0.1 mmol/l or less; and a forced fading rate constant $k_{vis}$ of $5.0 \times 10^{-2}$ [hour$^{-1}$] or less, in which the forced fading rate constant $k_{vis}$ is decided by printing a black square symbol of JIS code 2223 in 48-point by using the black ink, measuring a reflection density $D_{vis}$ of the printed symbol through a status A filter to obtain an initial density, forcedly fading the printed symbol by an ozone fading tester capable of continuously generating 5 ppm of ozone, and determining the time taken until the reflection density $D_{vis}$ reaches 80% of the initial density.

2. A black ink for ink-jet recording, comprising a first dye and a second dye dissolved and/or dispersed in an aqueous medium, in which the first dye has a λmax of 500 to 700 nm and a half value width of 100 nm or more in an absorption spectrum of a dilute solution normalized to an absorbance of 1.0 and the second dye has a λmax of 350 to 500 nm in an absorption spectrum of an aqueous solution, wherein the black ink has a transition metal ion content of 0.1 mmol/l or less, and wherein the first dye is a dye represented by the following general formula (1):

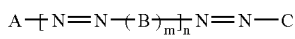

wherein A, B and C each independently represent an aromatic or heterocyclic group, which are substituted or unsubstituted; m is 1 or 2; n is 1 or 2 and two or more of A, B and C is a substituted or unsubstituted, unsaturated heterocyclic group.

3. A black ink for ink-jet recording, comprising a dye dissolved and/or dispersed in an aqueous medium, wherein the dye has a λmax of 500 to 700 nm and a half value width of 100 nm or more in an absorption spectrum of a dilute solution normalized to an absorbance of 1.0 and is a dye represented by the following general formula (1):

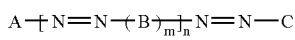

wherein A, B and C each independently represent an aromatic or heterocyclic group, which are substituted or unsubstituted provided that two or more of A, B and C is a substituted or unsubstituted, unsaturated heterocyclic group; m is 1 or 2; n is 1 or 2, wherein the black ink has a transition metal ion content of 0.1 mmol/l or less; and a ratio R of 1.2 or less, in which the ratio R is defined as a ratio of a maximum value to a minimum value of a forced fading rate constants $k_R$, $k_G$ and $k_B$ that are decided by printing a black square symbol of JIS code 2223 in 48-point by using the black ink, measuring reflection densities $D_R$, $D_G$ and $D_B$ of the printed symbol with respect to 3 colors of C (cyan), M (magenta) and Y (yellow) through a status A filter to obtain initial densities, respectively, forcedly fading the printed symbol by an ozone fading tester capable of continuously generating 5 ppm of ozone, and determining the times taken until the reflection densities $D_R$, $D_G$ and $D_B$ reach 80% of the initial densities, respectively.

4. A black ink for ink-jet recording, comprising a dye dissolved and/or dispersed in an aqueous medium, wherein the dye has a λmax of 500 to 700 nm and a half value width of 100 nm or more in an absorption spectrum of a dilute solution normalized to an absorbance of 1.0 and is a dye represented by the following general formula (1):

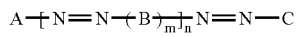

wherein A, B and C each independently represent an aromatic or heterocyclic group, which are substituted or unsubstituted provided that two or more of A, B and C is a substituted or unsubstituted, unsaturated heterocyclic group; m is 1 or 2; n is 1 or 2, wherein the black ink has a transition metal ion content of 0.1 mmol/l or less, and the black ink comprises a dye having an oxidation potential of more than 1.0 V (vs SCE).

5. The black ink for ink-jet recording according to claim 4, wherein the dye having a λmax of 500 to 700 nm includes a dye having an oxidation potential of more than 1.0 V (vs SCE).

6. The black ink for ink-jet recording according to claim 1, which has a ratio R of 1.2 or less, in which the ratio R is defined as a ratio of a maximum value to a minimum value of a forced fading rate constants $k_R$, $k_G$ and $k_B$ that are decided by printing a black square symbol of JIS code 2223 in 48-point by using the black ink, measuring reflection densities $D_R$, $D_G$ and $D_B$ of the printed symbol with respect to 3 colors of C (cyan), M (magenta) and Y (yellow) through a status A filter to obtain initial densities, respectively, forcedly fading the printed symbol by an ozone fading tester capable of continuously generating 5 ppm of ozone, and determining the times taken until the reflection densities $D_R$, $D_G$ and $D_B$ reach 80% of the initial densities, respectively.

7. The black ink for ink-jet recording according to claim 6, which comprises a dye having an oxidation potential of more than 1.0 V (vs SCE).

8. The black ink for ink-jet recording according to claim 2, which has: a forced fading rate constant $k_{vis}$ of $5.0 \times 10^{-2}$ [hour$^{-1}$] or less; and a ratio R of 1.2 or less, in which the forced fading rate constant $k_{vis}$ is decided by printing a black square symbol of JIS code 2223 in 48-point by using the black ink, measuring a reflection density $D_{vis}$ of the printed symbol through a status A filter to obtain an initial density, forcedly fading the printed symbol by an ozone fading tester capable of continuously generating 5 ppm of ozone, and determining the time taken until the reflection density $D_{vis}$ reaches 80% of the initial density, and the ratio R is defined as a ratio of a maximum value to a minimum value of a forced fading rate constants $k_R$, $k_G$ and $k_B$ that are decided by printing a black square symbol of JIS code 2223 in 48-point by using the black ink, measuring reflection densities $D_R$, $D_G$ and $D_B$ of the printed symbol with respect to 3 colors of C (cyan), M (magenta) and Y (yellow) through a status A filter to obtain initial densities, respectively, forcedly fading the printed symbol by an ozone fading tester capable of continuously generating 5 ppm of ozone, and determining the times taken until the reflection densities $D_R$, $D_G$ and $D_B$ reach 80% of the initial densities, respectively.

9. The black ink for ink-jet recording according to claim 8, which comprises a dye having an oxidation potential of more than 1.0 V (vs SCE).

10. The black ink for ink-jet recording according to claim 3, which has a forced fading rate constant $k_{vis}$ of $5.0 \times 10^{-2}$ [hour$^{-1}$] or less, in which the forced fading rate constant $k_{vis}$ is decided by printing a black square symbol of JIS code 2223 in 48-point by using the black ink, measuring a reflection density $D_{vis}$ of the printed symbol through a status A filter to obtain an initial density, forcedly fading the printed symbol by an ozone fading tester capable of continuously generating 5 ppm of ozone, and determining the time taken until the reflection density $D_{vis}$ reaches 80% of the initial density.

11. The black ink for ink-jet recording according to claim 10, which comprises a dye having an oxidation potential of more than 1.0 V (vs SCE).

12. The black ink for ink-jet recording according to claim 1, which comprises a second dye having a λmax of 350 to 500 nm in an absorption spectrum of an aqueous solution, wherein the second dye is represented by the following general formula (1):

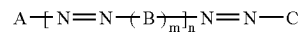

wherein A, B and C each independently represent an aromatic or heterocyclic group, which are substituted or unsubstituted; m is 1 or 2; n is an integer of 0 or more.

13. The black ink for ink-jet recording according to claim 2, wherein the second dye having a λmax of 350 to 500 nm in an absorption spectrum of an aqueous solution is represented by the following general formula (1):

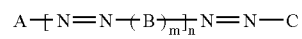

wherein A, B and C each independently represent an aromatic or heterocyclic group, which are substituted or unsubstituted; m is 1 or 2; n is an integer of 0 or more.

14. The black ink for ink-jet recording according to claim 3, which comprises a second dye having a λmax of 350 to 500 nm in an absorption spectrum of an aqueous solution, wherein the second dye is represented by the following general formula (1):

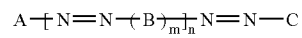

wherein A, B and C each independently represent an aromatic or heterocyclic group, which are substituted or unsubstituted; m is 1 or 2; n is an integer of 0 or more.

15. The black ink for ink-jet recording according to claim 4, which comprises a second dye having a λmax of 350 to 500 nm in an absorption spectrum of an aqueous solution, wherein the second dye is represented by the following general formula (1):

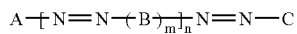

wherein A, B and C each independently represent an aromatic or heterocyclic group, which are substituted or unsubstituted; m is 1 or 2; n is an integer of 0 or more.

16. The black ink for ink-jet recording according to claim 1, wherein n in formula (1) is 1.

17. The black ink for ink-jet recording according to claim 1, wherein B and C in formula (1) each is an unsaturated heterocyclic group.

18. The black ink for ink-jet recording according to claim 2, wherein in the first dye, n in formula (1) is 1.

19. The black ink for ink-jet recording according to claim 2, wherein in the first dye, B and C in formula (1) each is an unsaturated heterocyclic group.

20. The black ink for ink-jet recording according to claim 3, wherein n in formula (1) is 1.

21. The black ink for ink-jet recording according to claim 3, wherein B and C in formula (1) each is an unsaturated heterocyclic group.

22. The black ink for ink-jet recording according to claim 4, wherein n in formula (1) is 1.

23. The black ink for ink-jet recording according to claim 4, wherein B and C in formula (1) each is an unsaturated heterocyclic group.

* * * * *